United States Patent
Sav et al.

(10) Patent No.: US 12,488,141 B2
(45) Date of Patent: *Dec. 2, 2025

(54) SYSTEM AND METHOD FOR PRIVACY-PRESERVING DISTRIBUTED TRAINING OF NEURAL NETWORK MODELS ON DISTRIBUTED DATASETS

(71) Applicant: Ecole Polytechnique Federale De Lausanne (EPFL), Lausanne (CH)

(72) Inventors: Sinem Sav, Lausanne (CH); Juan Ramon Troncoso-Pastoriza, Lausanne (CH); Apostolos Pyrgelis, Bretigny-sur-Morrens (CH); David Froelicher, Lausanne (CH); Joao Gomes De Sa E Sousa, Renens (CH); Jean-Philippe Bossuat, Lausanne (CH); Jean-Pierre Hubaux, ST-Sulpice (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 326 days.

This patent is subject to a terminal disclaimer.

(21) Appl. No.: 18/043,186

(22) PCT Filed: Aug. 27, 2020

(86) PCT No.: PCT/EP2020/074031
§ 371 (c)(1),
(2) Date: Feb. 27, 2023

(87) PCT Pub. No.: WO2022/042848
PCT Pub. Date: Mar. 3, 2022

(65) Prior Publication Data
US 2023/0325529 A1 Oct. 12, 2023

(51) Int. Cl.
*G06F 21/62* (2013.01)
*G06N 3/048* (2023.01)
(Continued)

(52) U.S. Cl.
CPC .......... *G06F 21/6245* (2013.01); *H04L 9/008* (2013.01); *H04L 9/0819* (2013.01);
(Continued)

(58) Field of Classification Search
CPC ... G06F 21/6245; H04L 9/008; H04L 9/0819; H04L 2209/46; G06N 3/048; G06N 3/084
See application file for complete search history.

(56) References Cited

U.S. PATENT DOCUMENTS 11,222,138 B2 * 1/2022 Mohassel ............. A63B 21/222
11,296,861 B1 * 4/2022 Zhang .................. H04L 9/3033
(Continued)

FOREIGN PATENT DOCUMENTS

WO   WO-2018174873 A1 * 9/2018 ......... G06F 21/6245

OTHER PUBLICATIONS

David Froelicher, Scalable Privacy-Preserving Distributed Learning (Year: 2020).*
(Continued)

*Primary Examiner* — Shewaye Gelagay
*Assistant Examiner* — Thomas A Carnes
(74) *Attorney, Agent, or Firm* — Hovey Williams LLP; Kameron D. Kelly

(57) ABSTRACT

A computer-implemented method and a distributed computer system for privacy-preserving distributed training of a global neural network model on distributed datasets. The system has data providers communicatively coupled with each having a respective local training dataset and a vector of output labels for training the global model. Further, it has a cryptographic distributed secret key and a corresponding collective cryptographic public key of a multiparty fully homomorphic encryption scheme, with the weights of the global model being encrypted with the collective public key. Each data provider computes and aggregates, for each layer
(Continued)

of the global model, encrypted local gradients using the respective local training dataset and output labels, with forward pass and backpropagation using stochastic gradient descent. One data provider homomorphically combines the current local gradients of the data providers into combined local gradients, and updates the weights of the current global model based on the combined local gradients.

14 Claims, 13 Drawing Sheets

(51) Int. Cl.
  *G06N 3/084* (2023.01)
  *H04L 9/00* (2022.01)
  *H04L 9/08* (2006.01)
(52) U.S. Cl.
  CPC ............. *G06N 3/048* (2023.01); *G06N 3/084* (2013.01); *H04L 2209/46* (2013.01)

(56) References Cited

U.S. PATENT DOCUMENTS

| | | | |
|---|---|---|---|
| 12,143,465 B2* | 11/2024 | Nandakumar | G06F 21/602 |
| 12,160,504 B2* | 12/2024 | Xu | H04L 9/0819 |
| 12,206,758 B2* | 1/2025 | Froelicher | G06F 7/544 |
| 2011/0110525 A1* | 5/2011 | Gentry | H04L 9/14 |
| | | | 380/285 |
| 2019/0294804 A1 | 9/2019 | Taylor et al. | |
| 2020/0252198 A1* | 8/2020 | Nandakumar | G06N 3/084 |
| 2022/0255764 A1* | 8/2022 | Li | G06F 21/606 |
| 2023/0074417 A1* | 3/2023 | Liu | G06N 3/084 |
| 2023/0325529 A1* | 10/2023 | Sav | G06F 21/6245 |
| | | | 726/26 |
| 2024/0015003 A1* | 1/2024 | Prasad | G06N 20/00 |
| 2024/0037252 A1* | 2/2024 | Zheng | G06F 21/604 |

OTHER PUBLICATIONS

David Froelicher et al., Scalable Privacy-Preserving Distributed Learning, Arxiv.org, Cornell University Library, Ithaca, NY, Jul. 2, 2020, XP081711295, p. 1-p. 15.

Le Trieu Phong et al., Privacy-Preserving Deep Learning via Additively Homomorphic Encryption, IACR, International Association for Cryptologic Research, vol. 20180104:045638, Aug. 1, 2017, pp. 1-18, XP061034574, http://eprint.iacr.org/2017/715.pdf.

PCT International Search Report and Written Opinion dated Jun. 24, 2021 for related PCT Application No. PCT/EP2020/074031, 16 pages.

* cited by examiner

Protocol 1 Collective Training

Inputs: $X_i, y_i$ for $i \in \{1, 2, ..., N\}$
Outputs: $W_{1,\cdot}^m, W_{2,\cdot}^m, ..., W_{\ell,\cdot}^m$

PREPARE:
1:     Parties collectively agree on $\ell, h_1, ..., h_\ell, \eta, \varphi(\cdot), m, b$
2:     Each $P_i$ generates $sk_i \leftarrow \mathsf{SecKeyGen}(1^\lambda)$
3:     Parties collectively generate $pk \leftarrow \mathsf{DKeyGen}(\{sk_i\})$
4:     Each $P_i$ encodes its local data as $\bar{X}_i, \bar{y}_i$
5:     $P_1$ initializes $W_{1,\cdot}^0, W_{2,\cdot}^0, ..., W_{\ell,\cdot}^0$
6: for $k = 0 \rightarrow m-1$ do
      MAP:
7:     $P_1$ sends $W_{1,\cdot}^k, W_{2,\cdot}^k, ..., W_{\ell,\cdot}^k$ down the tree
8:     Each $P_i$ does:
9:       Local Gradient Descent Computation:
10:       $\nabla W_{1,i}^k, \nabla W_{2,i}^k, ..., \nabla W_{\ell,i}^k$
      COMBINE:
11:     Parties collectively aggregate: $\nabla W_{1,\cdot}^k, ..., \nabla W_{\ell,\cdot}^k \leftarrow \sum_{i=1}^{N} \nabla W_{1,i}^k, ..., \nabla W_{\ell,i}^k$
12:     $P_1$ obtains $\nabla W_{1,\cdot}^k, \nabla W_{2,\cdot}^k, ..., \nabla W_{\ell,\cdot}^k$
      REDUCE (performed by $P_1$):
13:     for $j = 1 \rightarrow \ell$ do
14:       $W_{j,\cdot}^{k+1} += \eta \frac{\nabla W_{j,\cdot}^k}{b \times N}$
15:     end for
16: end for

FIG. 5A

Protocol 2 Local Gradient Descent (LGD) Computation

Inputs: $W_{1,\cdot}^k, W_{2,\cdot}^k, \ldots, W_{\ell,\cdot}^k$.
Outputs: $\nabla W_{1,i}^k, \nabla W_{2,i}^k, \ldots, \nabla W_{\ell,i}^k$. Note that $i$ and $k$ indices are omitted in this protocol.

1: for $t=1 \to b$ do ▷ Forward Pass
2:     $L_0 = \bar{X}[t]$
3:     for $j=1 \to \ell$ do
4:         $U_j = L_{j-1} \times W_j$
5:         $L_j = \varphi(U_j)$
6:     end for
7:     $E_\ell = \bar{y}[t] - L_\ell$ ▷ Backpropagation
8:     $E_\ell = \varphi'(U_\ell) \odot E_\ell$
9:     $\nabla W_\ell \mathrel{+}= L_{\ell-1}^T \times E_\ell$
10:     for $j=\ell-1 \to 1$ do
11:         $E_j = E_{j+1} \times W_{j+1}^T$
12:         $E_j = \varphi'(U_j) \odot E_j$
13:         $\nabla W_j \mathrel{+}= L_{j-1}^T \times E_j$
14:     end for
15: end for

FIG. 5B

Protocol 3 Alternating Packing (AP) Protocol

Inputs: $X_i, y_i, d, \{h_1, h_2, ..., h_\ell\}, \ell$
Outputs: $W_{1,\cdot}^0, W_{2,\cdot}^0, ..., W_{\ell,\cdot}^0, \bar{X}_i, \bar{y}_i$ 1: for $i = 1 \to N$ each $P_i$ do
2:     Initialize $|gap| = max(h_1 - d, 0)$     ▷ Input Preparation
3:     for $n = 1 \to |X_i|$ do
4:         $X_i[n] = $ Replicate$(X_i[n], h_1, gap)$
5:         $\bar{X}_i[n] = $ Encode$(X_i[n])$
6:     end for
7:     if $\ell \% 2 \mathrel{!}= 0$ then     ▷ Labels Preparation
8:         Initialize $|gap| = h_\ell$
9:         $y_i = $ Flatten$(y_i, gap, \text{'}\cdot\text{'})$
10:     end if
11:     $\bar{y}_i = $ Encode$(y_i)$
12:     if $i == 1$ then     ▷ $P_1$ performs Weight Initialization:
13:         Initialize $W_{1,\cdot}^0, W_{2,\cdot}^0, ..., W_{\ell,\cdot}^0$
14:         for $j = 1 \to \ell$ do
15:             if $j \% 2 == 0$ then     ▷ Row Packing
16:                 if $h_{j-2} > h_j$ then
17:                     Initialize $|gap| = h_{j-2} - h_j$
18:                 end if
19:                 $W_{j,\cdot}^0 = $ Flatten$(W_{j,\cdot}^0, gap, \text{'}r\text{'})$
20:                 $\bar{W}_{j,\cdot}^0 = $ Enc$(pk, W_{j,\cdot}^0)$
21:             else     ▷ Column Packing
22:                 if $h_{j+1} > h_{j-1}$ then
23:                     Initialize $|gap| = h_{j+1} - h_{j-1}$
24:                 end if
25:                 $W_{j,\cdot}^0 = $ Flatten$(W_{j,\cdot}^0, gap, \text{'}c\text{'})$
26:                 $\bar{W}_{j,\cdot}^0 = $ Enc$(pk, W_{j,\cdot}^0)$
27:             end if
28:         end for
29:     end if
30: end for

FIG. 5C

Protocol 4 DBootstrapALT($\cdot$)

Inputs: $c_{pk} = (c_0, c_1) \in R_{Q_\ell}^2$ encrypting $msg$, $\lambda$ a security parameter, $\phi(\cdot)$ a linear transformation over the field of complex numbers, $a$ a common reference polynomial, $s_i$ the secret-key of each party $P_i$, $\chi_{err}$ a distribution over $R$, where each coefficient is independently sampled from Gaussian distribution with the standard deviation $\sigma = 3.2$, and bound $\lfloor 6\sigma \rfloor$.
Constraints: $Q_\ell > (N+1) \cdot \|msg\| \cdot 2^\lambda$.
Outputs: $c'_{pk} = (c'_0, c'_1) \in R_{Q_L}^2$
1: for all $P_i$ do
2:    $M_i \leftarrow R_{\|msg\| \cdot 2^\lambda}$, $e_{0,i}, e_{1,i} \leftarrow \chi_{err}$
3:    $M'_i \leftarrow \mathsf{Encode}(\phi(\mathsf{Decode}(M_i)))$
4:    $h_{0,i} \leftarrow s_i c_1 + M_i + e_{0,i} \mod Q_\ell$
5:    $h_{1,i} \leftarrow -s_i a - M_i + e_{1,i} \mod Q_L$
6: end for
7: $h_0 \leftarrow \sum h_{0,i}, h_1 \leftarrow \sum h_{1,i}$
8: $c'_0 \leftarrow \mathsf{Encode}(\phi(\mathsf{Decode}(c_0 + h_0 \mod Q_\ell)))$
9: return $c'_{pk} = (c'_0 + h_1 \mod Q_L, a) \in R_{Q_L}^2$

FIG. 5D

Protocol 5 Convolutional Layer Packing

Inputs: $X, W_{1,\cdot}^0, n, h_1, h_2, s$
Outputs: $W_{1,\cdot}^0$
1: if $\mathsf{Type}(2) == \mathsf{FC} \&\& h_2 > h_1$ then
2:    Initialize $|gap| = h_2 - h_1$
3: end if
4: for $t = 1 \to n$ do
5:    $D_0, ..., D_z \leftarrow \mathsf{Decompose}(X[t], h_1 = f \times f, s)$
6:    for $j = 1 \to z$ do
7:       $vX = \mathsf{Flatten}(D_j, gap, 'r')$
8:    end for
9:    $\bar{X}[t] = \mathsf{Encode}(pk, vX)$
10: end for
11: $W_1 = \mathsf{Flatten}(W_{1,\cdot}, gap, 'r')$
12: $vW_1 = \mathsf{Replicate}(W_{1,\cdot}, t, gap)$
13: $W_{1,\cdot}^0 = \mathsf{Enc}(pk, vW_1)$

| | AP Approach |
|---|---|
| PREPARE: | |
| 1. Each $P_i$ prepares $X_i[n], y_i[n]$ | Encode $X_i[n], y_i[n] \to \bar{X}_i[n], \bar{y}_i[n]$ <br> $\bar{L}_0 = \bar{X}_i[n]$ |
| 2. $P1$ initializes $W_{1,\cdot}$ | Vectorize columns, pack with $\|gap\| = 0$ <br> $W_{1,\cdot}^0 = \text{Flatten}(W_{1,\cdot}^0, gap, \text{'c'})$ |
| 3. $P1$ initializes $W_{2,\cdot}$ | Vectorize rows, pack with $\|gap\| = d - h_\ell$ <br> $W_{2,\cdot}^0 = \text{Flatten}(W_{2,\cdot}^0, gap, \text{'r'})$ |
| 4. Each $P_i$ generates masks $\bar{m}_1, \bar{m}_2$ | $\bar{m}_1 = [1,0,0,0,1,0,0,0,1,0,0,0,1,\ldots]$ <br> $\bar{m}_2 = [1,1,0,0,0,0,0,0,0,0,0,0,0,\ldots]$ |
| Forward Pass (Each $P_i$): | F1. $U_1 = \text{Mul}_{pt}(\bar{L}_0, W_{1,\cdot})$, Res($U_1$) |
| 1. $U_1 = \bar{L}_0 \times W_{1,\cdot}$ | F2. $U_1 = \text{RIS}(U_1, 1, d)$ |
| 2. $L_1 = \varphi(U_1)$ | F3. $U_1 = \text{Mul}_{pt}(U_1, \bar{m}_1)$, Res($U_1$) |
| | F4. $U_1 = \text{RR}(U_1, 1, h_\ell)$ |
| | F5. $L_1 = \varphi(U_1)$ |
| 3. $U_2 = L_1 \times W_{2,\cdot}$ | F6. $U_2 = \text{Mul}_{ct}(L_1, W_{2,\cdot})$, Res($L_2$) |
| 4. $L_2 = \varphi(U_2)$ | F7. $U_2 = \text{RIS}(U_1, d, h_1)$ |
| | F8. $L_2 = \text{Mul}_{pt}(L_2, \bar{m}_2)$, Res($L_2$) |
| | F9. DBootstrap($U_2$) |
| | F10. $L_2 = \varphi(U_2)$ |
| Backpropagation (Each $P_i$): | |
| 1. $E_2 = \bar{y}_i[n] - L_2$ | B1. $E_2 = \text{Sub}(\bar{y}_i[n], L_2)$ |
| 2. $E_2 = (\varphi'(U_2)) \odot E_2$ | B2. $d = \varphi'(U_2)$ <br> B3. $E_2 = \text{Mul}_{ct}(E_2, d)$, Res($E_2$) <br> B4. $E_2 = \text{RR}(E_2, d, h_1)$ |
| 3. $\nabla W_{2,i} = L_1^T \times E_l$ | B5. $\nabla W_{2,i} = \text{Mul}_{ct}(L_1, E_2)$, Res($\nabla W_{2,i}$) |
| 4. $E_1 = E_2 \times W_{2,\cdot}^T$ | B6. $E_1 = \text{Mul}_{ct}(E_2, W_{2,i})$, Res($E_1$) <br> B7. $E_1 = \text{RIS}(E_1, 1, h_\ell)$ |
| 5. $E_1 = (\varphi'(U_1) \odot E_1)$ | B8. $d = \varphi'(U_1)$ <br> B9. $d = \text{Mul}_{pt}(d, \bar{m}_1)$ <br> B10. $E_1 = \text{Mul}_{ct}(E_1, d)$, Res($E_1$) <br> B11. DBootstrapALT($E_1$) |
| 6. $\nabla W_{1,i} = \bar{L}_0^T \times E_1$ | B12. $E_1 = \text{Mul}_{pt}(E_1, \bar{m}_1)$, Res($E_1$) <br> B13. $E_1 = \text{RR}(E_1, 1, d)$ <br> B14. $\nabla W_{1,i} = \text{Mul}_{pt}(\bar{L}_0, E_1)$, Res($\nabla W_{1,i}$) |
| Update (at $P_1$): | U1. SetScale($\nabla W_{j,\cdot}, S_{\nabla W_{j,\cdot}} \times (b \times N))/\eta$ |
| 1. $W_{j,\cdot} += \eta \frac{\nabla W_{j,\cdot}}{b \times N}$ <br> $\forall j \in \{1,2,\ldots,l\}$ | U2. $W_{j,\cdot} = \text{Add}(W_{j,\cdot}, \nabla W_{j,\cdot})$ <br> U3. DBootstrap($W_{j,\cdot}$) | to 602

| | Computational Complexity | #Levels Used | Communication | Rounds |
|---|---|---|---|---|
| FORWARD P. (FP) | $(\log_2(h_{i-1})+\log_2(h_{i+1}))\cdot KS+Mul_{ct}+Mul_{pt}+\varphi$ | $2+\lceil\log_2(d_a+1)\rceil$ | – | – |
| BACKWARD P. (BP) | $(\log_2(h_{i-1})+\log_2(h_{i+1}))\cdot KS+2Mul_{ct}+Mul_{pt}+\varphi'$ | $3+\lceil\log_2(d_a)\rceil$ | – | – |
| MAP | $\ell(FP+BP)-2\log_2(h_\ell)$ | $\ell(5+\lceil\log_2(d_a+1)+\lceil\log_2(d_a)\rceil\rceil)$ | $z(N-1)|c|$ | 1/2 |
| COMBINE | – | – | $z(N-1)|c|$ | 1/2 |
| REDUCE | $\ell(Mul_{pt}+DB)$ | – | – | – |
| DBootstrap (DB) | $N\log_2(N)(L+1)+N\log_2(N)(L_c+1)$ | – | $(N-1)|c|$ | 1 |
| Mul Plaintext ($Mul_{pt}$) | $2N(L_c+1)$ | 1 | – | – |
| Mul Ciphertext ($Mul_{ct}$) | $4N(L_c+1)+KS$ | 1 | – | – |
| Approx. Activation Function ($\varphi$) | $(2^\kappa+m-\kappa-3+\lceil(d_a+1)/2^\kappa\rceil)\cdot Mul_{ct}$ | $\lceil\log_2(d_a+1)\rceil$ | – | – |
| RIS($c,p,s$), RR($c,p,s$) | $\log_2(s)\cdot KS$ | – | – | – |
| Key-switch (KS) | $\mathcal{O}(N\log_2(N)L_c\beta)$ | – | – | – |

| Notation | Description |
|---|---|
| $P_i$ | $i^{th}$ Party |
| $Q$ | Querier |
| $X_i$ | Input matrix of $P_i$ |
| $X_i[n]$ | $n^{th}$ row of the input matrix |
| $y_i$ | True labels of $P_i$ |
| $N$ | Total number of parties |
| $W_{j,i}^k$ | Weight matrix in $P_i$, for a layer $j$, at $k^{th}$ iteration |
| $n$ | Number of data samples |
| $d$ | Number of features |
| $d_a$ | Degree of an approximated polynomial |
| $\ell$ | Total number of layers |
| $h_j$ | Number of neurons in $j^{th}$ layer |
| $h_\ell$ | Number of output labels |
| $\eta$ | Learning rate |
| $\varphi(\cdot)$ | Activation function |
| $\varphi'(\cdot)$ | Derivative of the activation function |
| $E_j^k$ | Error propagated in layer $j$, at $k^{th}$ iteration |
| $\nabla W_{j,i}^k$ | Gradient computed in $P_i$, for a layer $j$, at $k^{th}$ iteration |
| $b$ | Local batch size |
| $B$ | Global batch size |
| $m$ | Number of global iterations |
| $\odot$ | Element-wise multiplication |
| $\times$ | Matrix or vector multiplication |
| $\mathbf{W}$ | Encryption of $W$ (bold-face) |
| $\overline{msg}$ | Encoded (packed) plaintext vector $msg$ |
| $\mathcal{N}$ | Ring dimension |
| $\lambda$ | Security level |
| $A^T$ | Transpose of matrix $A$ |
| $L$ | Initial level of a ciphertext |
| $S$ | Initial scale of a ciphertext |
| $L_c$ | Current level of a ciphertext $c$ |
| $RIS(c,p,s)$ | RotateInnerSum with $log_2(s)$ number of rotations. |
| $RR(c,p,s)$ | RotateReplication with $log_2(s)$ number of rotations. |
| $S_c$ | Current scale of a ciphertext $c$ |

FIG. 8

SYSTEM AND METHOD FOR PRIVACY-PRESERVING DISTRIBUTED TRAINING OF NEURAL NETWORK MODELS ON DISTRIBUTED DATASETS

RELATED APPLICATIONS

This application is a national stage application, under 35 U.S.C. § 371 of International Patent Application No. PCT/EP2020/074031, filed on Aug. 27, 2020 and published as WO 2022/042848 on Mar. 3, 2022, which is hereby incorporated by reference in its entirety.

TECHNICAL FIELD

The present invention generally relates to electronic data processing, and more particularly, relates to methods, computer program products and systems for training and executing neural networks on distributed secret datasets.

BACKGROUND

The training of machine-learning (ML) models usually requires large and diverse datasets. In many domains, such as medicine and finance, assembling sufficiently large datasets has been proven difficult and often requires the sharing of data among multiple data providers (i.e. computer systems which are able to contribute data to such large and diverse datasets). This is particularly true in medicine, where patients' data are spread among multiple entities: For example, for rare diseases, one hospital might have only a few patients, whereas a medical study requires hundreds of them to produce meaningful results. Data sharing among many entities, which can be disseminated over multiple countries, is hence required. However, in such and many other situations, the secrecy of data has to be ensured which makes it particularly difficult to share.

Hence, it is very difficult to obtain sufficient data to train ML models that are key enablers in medical research, finance analysis, and many other domains where the secrecy of the underlying data is to be guaranteed. Prior art solutions have been proposed for secure predictions using pre-trained models. However, secure training of ML models, which is much more computationally demanding, is still a field with potential for improvement.

Some centralized solutions have been proposed which rely on homomorphic encryption (HE). They have the advantage of being straightforward to implement but require individual records to be transferred out of the control of their owners, which is contravening data secrecy/privacy requirements. Also, moving data to a central repository can result in a single point of failure. Secure multiparty computation solutions (SMC) proposed for this scenario often assume that the computing parties are honest-but-curious and non-colluding. These assumptions might not hold when the data is sensitive and/or when the parties have competing interests.

In contrast, homomorphic encryption-based (HE) or hybrid (HE and SMC) solutions, that assume a malicious threat model (e.g., Anytrust model in D. Wolinsky, H. Corrigan-Gibbs, B. Ford, and A. Johnson. Scalable anonymous group communication in the anytrust model. 2012), focus on limited ML operations (e.g., the training of regularized linear models with low number of features) and are not quantum-secure. In the publication of W. Zheng, R. A. Popa, J. E. Gonzalez, and I. Stoica. Helen: Maliciously secure coopetitive learning for linear models. In IEEE Symposium on Security and Privacy (S&P), 2019, a system is proposed that uses HE and verifiable secret sharing to execute alternating direction method of multipliers (ADMM), a convex optimization approach for distributed data, which supports regularized linear models. Recent advances in quantum computing have made this technology a potential threat for existing cryptographic solutions in a not so far future. Whereas the above Zhen et al. publication solely focuses on regularized linear models, the following references disclose systems using neural networks:

- P. Mohassel and Y. Zhang. SecureML: A system for scalable privacy-preserving machine learning. In 2017 IEEE Symposium on Security and Privacy (SP), pages 19-38, May 2017, describes a 2-server setting where the data owners process, and secret-share their data among two non-colluding servers that are responsible for training the machine learning model, combining secret-sharing and garbled circuits;
- P. Mohassel and P. Rindal. Aby 3: a mixed protocol framework for machine learning. In ACM Conference on Computer and Communications Security (CCS), 2018, extends the previous approach to three servers and a malicious adversarial setting; and
- S. Wagh, D. Gupta, and N. Chandran. SecureNN: 3-party secure computation for neural network training. Privacy Enhancing Technologies (PETS), 2019, proposes privacy-preserving secure neural network training on secret shared data over a 3-party setting without garbled circuits.

The aforementioned distributed approaches are practical only with a small number of parties and focus either on training or prediction. Moreover, they do not consider the complete ML workflow, nor enable the training of a model that remains secret and enables oblivious prediction on secret data. In many cases, the trained model is as sensitive as the data on which it is trained, and the use of the model after the training has to be tightly controlled. For example, entities that collaborate to train a ML model should all equally benefit from the resulting model, and its usage has to be controlled.

Froelicher et al. recently proposed SPINDLE (cf. D. Froelicher, J. R. Troncoso-Pastoriza, A. Pyrgelis, S. Say, J. S. Sousa, J.-P. Bossuat, and J.-P. Hubaux. Scalable privacy-preserving distributed learning, 2020), a generic approach for the privacy-preserving training of machine learning models in an N-party setting that employs multiparty lattice-based cryptography, thus achieving post-quantum security guarantees. However, the SPINDLE approach is only demonstrated for generalized linear models, and the presented solution lacks the necessary protocols and functions that can support the training of complex machine learning models, such as neural networks with multiple layers.

SUMMARY

There is therefore a need to provide systems and methods to enable privacy-preserving learning and prediction among multiple parties (data providers DPs) that do not trust each other to protect the secrecy of the underlying data and neural network models, but achieves training accuracy levels on par with centralized or decentralized non-private approaches. In more detail, it is an objective to protect both the intermediate updates of the neural network and the final model weights (that can potentially leak information about the parties' input data) from any party. In the inference step, the parties who are enabled to access the protected neural network model should not learn a querier's data, or the prediction results, and the querier should not obtain the model's weights. In other words, the parties' and querier's data confidentiality, as well as the trained model confidentiality are to be protected.

With regard to data confidentiality, during training and prediction, no party $P_i$ (including the querier $P_q$) should learn more information about the input data $X_j$ of any other honest party $P_j$ (j≠i, including the querier $P_q$), other than what can be deduced from its own input data $X_i, y_i$ (or the input $X_q$ and output $y_q$ for the querier). With regard to model confidentiality, during training and prediction, no party $P_i$ (including the querier $P_q$) should gain more information about the trained model weights, other than what can be deduced from its own input data $X_i, y_i$ (or $X_q, y_q$ for the querier).

In general, neural networks (NNs) are machine learning algorithms that extract complex non-linear relationships between the input and output data. They are used in a wide range of fields such as pattern recognition, data/image analysis, face recognition, forecasting, and data validation in the medical field, banking, finance, marketing, and health industries. Typical NNs are composed of a pipeline of layers where feed-forward and backpropagation steps for linear and non-linear transformations (activations) are applied to the input data iteratively.

Each training iteration is composed of one forward pass and one backward pass, and the term epoch refers to processing once all the samples in a dataset. Multilayer perceptrons (MLPs) are fully-connected deep neural network structures which are widely used in the industry, e.g., they constitute 61% of Tensor Processing Units' workload in Google's datacenters. MLPs are composed of an input layer, one or more hidden layer(s), as well as an output layer, and each neuron is connected to all the neurons in the following layer. At iteration k, the weights between layers j and j+1, are denoted by a matrix $W_j^k$, whereas the matrix $L_j$ represents the activation of the neurons in the $j^{th}$ layer. The forward pass requires first the linear combination of each layer's weights with the activation values of the previous layer, i.e., $U_j = W_j^k \times L_{j-1}$. Then, an activation function is applied to calculate the values of each layer as $L_j = \phi(U_j)$.

Backpropagation, a method based on gradient descent, is then used to update the weights during the backward pass. Herein, the update rules for mini-batch gradient descent are described where a random batch of sample inputs of size B is used in each iteration. The aim is to minimize each iteration's error based on a cost function E (e.g., mean squared error) and update the weights accordingly. The update rule is $$W_j^{k+1} = W_j^k - \frac{\eta}{B} \nabla W_j^k,$$

where η is the learning rate and $\nabla W_j^k$ denotes the gradient of the cost function with respect to the weights and calculated as $$W_j^k = \frac{\delta E}{\delta W_j^k}.$$

Backpropagation requires several transpose operations applied to matrices/vectors and we denote transpose of a matrix/vector as $W^T$.

Convolutional neural networks (CNNs) follow a very similar sequence of operations, i.e., forward and backpropagation passes, and typically consist of convolutional (CV), pooling, and fully connected (FC) layers. It is worth mentioning that CV layer operations can be expressed as FC layer operations by representing them as matrix multiplications; in the protocols used herein, CV layer operations are simplified by employing this representation. Finally, pooling layers are down-sampling layers where a kernel, i.e., a matrix that moves over the input matrix with a stride of a, is convoluted with the current sub-matrix. For a kernel of size k×k, the minimum, maximum, or average (depending on the pooling type) of each k×k sub-matrix of the layer's input is computed.

For distributed deep learning models, the well-known MapReduce abstraction is employed to describe the training of data-parallel NNs in a distributed setting where multiple data providers hold their respective datasets. A variant of the parallel stochastic gradient descent algorithm can be used, where each party performs b local iterations and calculates each layer's partial (local) gradients. These gradients are then aggregated over all parties and the reducer performs the model update with the average of gradients. This process is repeated for m global iterations. Thereby, averaging the gradients from N parties is equivalent to performing batch gradient descent with a batch size of b×N. Therefore, the local batch size as b is differentiated from the global batch size B=b×N.

In other words, the above technical problem is solved by the features of the independent claims providing a solution that leverages the so-called MapReduce abstraction [cf., J. Dean and S. Ghemawat. MapReduce: simplified data processing on large clusters. Communications of the ACM, 2008] which can be used to define distributed ML tasks. MapReduce defines parallel and distributed algorithms in the following abstraction: PREPARE (data preparation), MAP (distributed computations executed independently by multiple nodes or machines), COMBINE (combination of the MAP results, e.g., aggregation) and REDUCE (computation on the combined results). Based on this abstraction the herein disclosed approach determines and delimits which information, e.g., MAP outputs, have to be protected to design a decentralized privacy-preserving system for neural network training and prediction. The partitioned (distributed) data is leveraged to enable DPs to keep control of their respective data, and the computation is distributed to provide an efficient solution for the training of NN models on confidential/secret data. After the training, the model is kept secret from all entities and is obliviously and collectively used to provide predictions on confidential/secret data that are known only to the entity requesting the prediction (that is, to the data consumer).

The claimed solution achieves its objectives by exploiting a multiparty homomorphic encryption (MHE) scheme. In particular, the model weights are kept encrypted, with the parties' collective public key, throughout the training process. The operations required for communication-efficient training of neural networks are enabled by the scheme's computation homomorphic properties, which enables the parties to perform operations between their local data and the encrypted model weights. To enable oblivious inference on the trained model, the claimed solution utilizes the MHE scheme's key-switching functionality that allows the parties to collectively re-encrypt the prediction results with the querier's public key. The claimed solution employs several packing schemes (MHE scheme with packing capabilities) to enable Single Instruction, Multiple Data (SIMD) operations on the weights of various network layers (e.g., fully connected or convolutional ones) and uses approximations that enable the evaluation of multiple activation functions (e.g., Sigmoid, Softmax, ReLU) under encryption. Thereby, packing enables coding a vector of values in a ciphertext and to parallelize the computations across its different slots. Furthermore, to account for the complex operations required for the forward and backward passes performed during the training of a neural network, the claimed solution uses the MHE scheme's distributed (collective) bootstrapping capability that allows to refresh ciphertexts. Although the herein disclosed approach is described as a synchronous distributed learning protocol, an extension to asynchronous distributed neural networks can be achieved, too.

In one embodiment, the Cheon-Kim-Kim-Song (CKKS) variant of the MHE scheme may be used (cf. J. H. Cheon, A. Kim, M. Kim, and Y. Song. Homomorphic encryption for arithmetic of approximate numbers. In Springer International Conference on the Theory and Application of Cryptology and Information Security (ASIACRYPT), 2017.) In this scheme, a public collective key is known by all parties while the corresponding secret key is distributed among them. As such, decryption is only possible with the participation of all parties. This scheme is well suited for floating point arithmetic, and it is based on the ring learning with errors (RLWE) problem, making the herein disclosed approach secure against post-quantum attacks. Further, it enables secure and flexible collaborative computations between parties without sharing their respective secret key, and it enables a secure collective key-switch functionality, that is, changing the encryption key of a ciphertext without decryption. A brief description of the cryptographic scheme's functionalities is given in the detailed description.

Res(.) is applied to a resulting ciphertext after each multiplication. Further, for a ciphertext at an initial level L, at most an L-depth circuit can be evaluated. To enable more homomorphic operations to be carried on, the ciphertext must be re-encrypted to its original level L. This is done by the bootstrapping functionality (DBootstrap(.)). Encode(.) enables us to pack several values into one ciphertext and operate on them in parallel. For the sake of clarity, we differentiate between the functionality of the collective key-switch (DKeySwitch(.)), that requires interaction between all the parties, and a local key-switch (KS(.)) that uses a special public-key. The former is used to decrypt the results or change the encryption key of a ciphertext. The latter, which does not require interactivity, is used during the local computation for slot rotations or relinearization after each multiplication.

To describe the distributed training of and evaluation on NNs, the extended MapReduce abstraction for privacy-preserving machine learning computations introduced in the above-mentioned SPINDLE paper is employed. The overall learning procedure is composed of four phases: PREPARE, MAP, COMBINE, and REDUCE. Protocol 1 describes the steps required for the federated training of a neural network with N parties. The bold terms denote encrypted values and $W_{j,i}^k$ represents the weight matrix of the jth layer, at iteration k, of the party $P_i$. When there is no ambiguity or when referring to the global model, sub-index "i" is replaced with "•" and weights are denoted by $W_{j,\bullet}^k$. Similarly, the local gradients at party $P_i$ are denoted by $\nabla W_{j,i}^k$, for each network layer j and iteration k. Throughout this document, the nth row of a matrix that belongs to the $i^{th}$ party is represented by $X_i[n]$ and its encoded (packed) version as $\bar{X}_i[n]$.

PREPARE: In one embodiment, in this offline phase, the parties collectively agree on the learning parameters: the number of hidden layers (l), the number of neurons ($h_j$) in each layer j, j∈1, 2, . . . , l, the learning rate (q), the number of global iterations (m), the activation functions to be used in each layer ($\varphi($ $)$) and their approximations, and the local batch size (b). Then, the parties generate their secret keys $sk_i$ and collectively generate the public key pk. Subsequently, they can optionally perform a collective normalization or standardization on their input data with a secure aggregation protocol as described in D. Froelicher, J. R. Troncoso-Pastoriza, J. S. Sousa, and J. Hubaux. Drynx: Decentralized, secure, verifiable system for statistical queries and machine learning on distributed datasets. IEEE Transactions on Information Forensics and Security, 15:3035-3050, 2020. Each Pi encodes (packs) its input data samples $X_i$ and output labels $y_i$ (see Section V-A) as $\bar{X}_i, \bar{y}_i$. Finally, the root of the tree ($P_1$) initializes and encrypts the global weights.

Weight Initialization. To avoid exploding or vanishing gradients, commonly used techniques can be used, such as:
(i) Xavier initialization for the sigmoid or tanh activated layers: $W_j = r \times h_{j-1}$, where r is a random number sampled from a uniform distribution in the range [−1,1] (cf. X. Glorot and Y. Bengio. Understanding the difficulty of training deep feedforward neural networks. In AISTATS, 2010.), or
(ii) He initialization for ReLU activated layers, where the Xavier-initialized weights are multiplied twice by their variance (cf. K. He, X. Zhang, S. Ren, and J. Sun. Delving deep into rectifiers: Surpassing human-level performance on imagenet classification. In 2015 IEEE International Conference on Computer Vision (ICCV), pages 1026-1034, 2015.)

Details of the MapReduce protocols which can be used for implementing the herein presented approach are described with FIG. 5A to 5D in the detailed description.

In one embodiment, a system for scalable privacy-preserving distributed learning is proposed that enables the privacy-preserving training of so-called feed-forward neural networks. Feed-forward neural networks are composed of a pipeline of layers in which the first layer is called the Input Layer, the last one is the Output Layer and all the in-between layers are Hidden Layers (as their values are not observed in the training set). Feed-forward neural networks with more than one hidden layer are often referred to as deep neural networks. The layers are vectors of neurons, the input and output neurons simply input and output values respectively, whereas the neurons in the hidden layers define an activation function that processes the inputs and produces one scalar output per neuron. The feed-forward neural networks, as referred to herein, use hidden layers comprising only activation functions that can be approximated by a polynomial function. The neurons are connected by weighted links; the weight of a link multiplies the value that is sent from one neuron to the other. The goal of the neural network is to adapt these weights to capture a (possibly complex) relation between the input and the output. This can be done by training the neural network by using a training (labeled) dataset in which the outputs for specific inputs are known. The weights are iteratively adapted to capture this input-output relation while minimizing the error such that the network can then be used to predict outputs for non-labeled inputs.

The training of the feed-forward neural network can be performed with an iterative training algorithm. In general, multidimensional optimization algorithms can be used to train a feed-forward neural network, as part of the back-propagation algorithm (e.g., gradient descent, Newton, Conjugated gradient, Quasi-Newton, Levenberg-Marquardt, among others), which can be performed in batch or online mode. For example, a backpropagation algorithm based on the gradient descent may be used, in which each iteration comprises a forward and a backward pass. In the forward pass, the inputs are processed through the network to generate an output. The backpropagation algorithm can then be used to update the weights between all the layers by employing a method that can be based on the gradient descent. In principle, this iterative algorithm aims at reducing the error (the difference between the obtained output and the true (label) output) by finding the weights that correspond to the minimum of a loss function depending on this error. This is done by calculating the update on the weights based on the variation of the loss function. For example, this can be done efficiently by computing the gradient of the loss function and using the chain rule that links the layers backwards, from the output layer to the input layer.

In one embodiment, a computer-implemented method is provided for privacy-preserving distributed training of a neural network model on a plurality of local datasets. The neural network model is referred to as global model herein. The plurality of local datasets together represents a global training dataset for the global model.

The various training datasets (local datasets) are provided by a plurality of data providers which are communicatively coupled. The communicative coupling is implemented such that each data provider can exchange information with each other data provider of the plurality. However, this does not require a direct communication channel between a particular data provider and all remaining data providers. Rather, it is sufficient when two data providers can communicate via one or more of the other data providers.

Besides its local dataset, each of the data providers has a vector of output labels. The respective local training dataset of the data provider with respective output labels is used for training the global model by using an iterative training algorithm (IA).

Further, each of the data providers has a portion of a cryptographic distributed secret key and a corresponding collective cryptographic public key of a multiparty fully homomorphic encryption scheme. Optionally, local training datasets may be encrypted with the collective public key. The cryptographic keys are collectively initialized by the plurality of data providers. The distributed secret key ensures that no data provider can ever decrypt any encrypted content of a particular data provider if not all data providers having portions of the secret key provide their consent in accordance with the fully homomorphic encryption scheme.

In a preparation phase (PREPARE step), all data providers have already agreed on a structure and data formats to which all the local training datasets and output labels adhere. Further, all data providers use the same training parameters (e.g., the number of hidden layers, the number of neurons in each layer, the learning rate, the number of global iterations, the activation functions to be used in each layer and their approximations, and the local batch size wherein the local batch size is the number of data samples processed at each iteration).

The predefined maximum number of global iterations is the agreed limit for performing global iterations, where each global iteration ends with an update of the global model such that it reflects the combined training status of the data providers' current local gradients. The number of global iterations which are actually performed can also be lower than the predefined maximum number of global iterations. For example, if a training level perceived as a sufficient training level is achieved, then the method may already stop global model updates after a lower number of global iterations when the sufficient training level is achieved.

With each global iteration, each data provider receives the current encrypted weights of the global model and computes and aggregates encrypted local gradients for each layer of the global model by processing each input data sample of a respective encrypted local batch of the local dataset and the respective encrypted output labels with forward pass and backpropagation using stochastic gradient descent. It is to be noted that the distributed secure training method can be operated in a synchronous mode or in an asynchronous mode.

In the synchronous mode, each data provider of the plurality of data providers receives the current weights of the global model and provides its aggregated encrypted gradients in a single global iteration loop. In the asynchronous mode, multiple global iteration loops are performed wherein each global iteration loop is performed for a subset of data providers (receiver-subset). Finally, the asynchronously obtained gradients of all receiver-subsets are used to update the global model. That is, in the asynchronous mode, only a receiver-subset of data providers is available in one given global iteration loop. For example, the data providers could be divided in two (possibly disjoint) groups g0 and g1, in such a way that odd iterations would use updates from g0, whereas even iterations would get updates from g1. A person skilled in the art can also divide the plurality of data providers into more than two receiver-subsets.

The current encrypted aggregated local gradients are then provided to at least a subset of the data providers (combiner-subset). In other words, each data provider can broadcast its aggregated encrypted local gradients to all other data providers which would enable any data provider to perform the following steps for updating the global model, or the aggregated encrypted local gradients are only sent to a combiner-subset of data providers performing the global model updating activities, which—in the extreme case—can be even a single data provider.

At least one data provider of the combiner-subset of data providers homomorphically combines at least a subset of the encrypted aggregated local models into combined aggregated gradients. In other words, the at least one data provider who belongs to the combiner-subset having received all or at least a subset of the encrypted aggregated local gradients is now able to generate the combined aggregated gradients from the aggregated gradients of all or at least the subset of the data providers of the plurality of data providers. It is sufficient to perform the homomorphic combination by a single data provider. However, the combination can also be performed by any data provider of the combiner-subset. Typically, a combiner-subset is the same as the corresponding receiver-subset. However, there may be situations, where not all of the data providers in the receiver-subset also participate in the combiner-subset.

The at least one data provider (i.e. the data provider(s) of the combiner-subset who performed the homomorphic combination) then updates the weights of the current global model based on the combined aggregated gradients. In other words, the global model is updated from its previous state by using averaged combined aggregated gradients wherein averaging is performed with respect to the global batch size being the dot product between the local batch size and the number of data providers.

Once the update is completed, the at least one data provider provides the updated current weights of global model to the plurality of data providers. For example, the updated weights of the global model may be broadcast to some (receiver-subset in the asynchronous mode) or all other data providers (in the synchronous mode), or the updated global model may be provided at a predefined storage location from where the weights can be retrieved by the other data providers.

In one embodiment, the global model which has been trained (i.e. updated) based on the distributed training datasets of the various data providers as described above, can now be used to provide predictions in response to input data provided by a querying entity. The querying entity may be one of the data providers or it may be a further entity which is sending a corresponding query to one of the data providers. That is, a particular data provider of the plurality of data providers receives, from a querying entity (which can also be the particular provider itself), a request including input data which serves as an input to the global model for a prediction task. The received input data is encrypted with the collective public key which guarantees the secrecy of the input data versus all data providers which are different from the querying entity. Further, the request includes a destination public key of a destination entity. The destination entity is the recipient of a prediction result to be provided by the global model in response to the input data. The destination entity is a computing device which can be the querying entity or it can be different from the querying entity. For example, the plurality of data providers may be computer systems of a plurality of hospitals which all train their local models with local datasets to predict a particular skin cancer disease from a respective image. The querying entity may be one of the hospital data providers or it may be a computer of a further hospital which is actually not forming part of the hospital data providers. The destination entity may be a computing device of a particular patient who is treated by the querying hospital. It may be advantageous that the result of the prediction can only be decrypted by the destination entity but not necessarily by the querying entity.

In response to the input data, each data provider can now obtain one or more corresponding encrypted prediction values by applying the encrypted global model to the encrypted input data (because each of the data providers has a copy of or at least access to the global or model). The one or more encrypted prediction values are then switched to the destination public key. This guarantees that only the destination entity can decrypt the one or more encrypted prediction values. The switched one or more encrypted prediction values are then provided to the querying entity. Key switching in the context of fully homomorphic encryption is well known to a person skilled in the art.

In an alternative embodiment, the plurality of data providers being in possession of one or more destination public keys of one or more respective destination entities can collectively switch the global model (encrypted with the collective public key) to the one or more destination public keys and then provide the resulting one or more switched global models to the respective destination entities. Each destination entity can decrypt the received global model with the secret-key related to its own destination public key and thus obtain the corresponding decrypted global model. In this embodiment, a destination entity can then use the clear text global model in its own secure environment by feeding clear text input data into the model to retrieve clear text prediction results from the model. No encrypted query needs to be sent to any of the data providers. Nevertheless, the local models of the various data providers (and their respective local training datasets) remain entirely hidden from the destination entity.

In one embodiment, homomorphically combining the current local models is performed ascending a tree structure, such that each data provider aggregates its own current aggregated local gradient with current aggregated local gradients of its children, and sends the aggregate result to its parent. This aggregation via the tree structure allows the data provider at the root of the tree structure (root data provider) to efficiently obtain the updated weights of the global model combined from all current aggregated local gradients. This embodiment implies that all data providers can directly communicate with each other through respective communication channels so that a tree structure can be formed dynamically to efficiently answer a query.

In one embodiment, a distributed computer system is provided for privacy-preserving distributed training of a neural network model—referred to as global model—on distributed datasets associated with different data providers. The distributed computer system includes a plurality of data providers being communicatively coupled such that each data provider can exchange information with any other data provider. Each data provider holds its own local dataset and has a vector of output labels which are used for training the global model using an iterative training algorithm. Further, each data provider has a portion of a cryptographic distributed secret key and a corresponding collective cryptographic public key of a multiparty fully homomorphic encryption scheme. The cryptographic keys are collectively initialized by the plurality of data providers. The local training datasets and output labels of all data provider systems adhere to the same structure and data formats. All data providers use the same training parameters (as described previously in the context of the PREPARE phase of the computer-implemented method). The plurality of all local training datasets represents a global training dataset for the global model. The global model is also encrypted with the collective public key. That is, the weights of the global model are initialized and are encrypted with the collective public key.

In the synchronous mode, each data provider is configured to compute and aggregate encrypted local gradients for each layer of the global model by using the respective method step described above. In the asynchronous mode, only a receiver-subset of the data providers may be involved in a given global iteration loop. Then, the current encrypted aggregated local gradients are provided to at least a combiner-subset of the data providers.

At least one data provider of the combiner-subset is configured to homomorphically combine at least a subset of current encrypted aggregated local gradients into combined aggregated gradients, and to update the weights of the current global model based on the combined aggregated gradients. The updated weights of the global model are then provided to a receiver-subset or to all other data providers of the plurality of data providers.

In one embodiment, the computer system is used for data prediction. In this embodiment, a particular data provider of the plurality of data providers is configured to receive, from a querying entity, input data encrypted with the collective public key, and to receive a destination public key of a destination entity (DE). The destination entity is the recipient of a prediction result to be provided in response to the input data. In response to the input data, the particular data provider obtains one or more corresponding encrypted prediction values by applying the encrypted global model to the encrypted input data, and switches the one or more encrypted prediction values to the destination public key. The switched one or more encrypted prediction values are then provided to the querying entity so that only the destination entity can decrypt the one or more encrypted prediction values.

The above-described privacy-preserving distributed training and evaluation of ML models extends the widespread MapReduce abstraction with privacy constraints and implements an extended MapReduce abstraction in the form of an operational and efficient distributed system that enables the privacy-preserving execution of a complete machine-learning workflow, including data preparation, learning, and prediction for generalized linear models, on a dataset that is distributed among many data providers.

The herein disclosed optimizations enable efficient use of a quantum-resistant or quantum-secure cryptographic scheme (also known as post-quantum, quantum-proof, or quantum-safe cryptography) by relying on parallel computations, SIMD operations, and optimized polynomial approximations of the models' activation functions, such as for example, sigmoid and softmax.

The herein disclosed concept allows to train a neural network model in a privacy-friendly manner with a setting where secret (e.g. sensitive) data is distributed among multiple (untrusted) data providers, and where only one trusted data provider is required to make neural network model training and subsequent prediction secure. Thereby, local gradients and prediction results stay secret while using a global model that has been trained with many distributed datasets to achieve a high prediction accuracy.

Further aspects of the invention will be realized and attained by means of the elements and combinations particularly depicted in the appended claims. It is to be understood that both the foregoing general description and the following detailed description are exemplary and explanatory only, and are not restrictive of the invention as described.

BRIEF DESCRIPTION OF THE DRAWINGS

FIGS. 5A, 5B, 5C, 5D, 5E are pseudo-code examples of example protocols which are used by embodiments of the distributed computer system;

FIG. 6A, 6B illustrate an example of an execution pipeline for a 2-layer MLP network with Alternating Packing according to an embodiment;

FIG. 7 shows a table illustrating complexity analysis of the building blocks of the distributed computer system according to an embodiment; and FIG. 8 shows a table with the description of notations as used herein.

DETAILED DESCRIPTION

Figure 1:
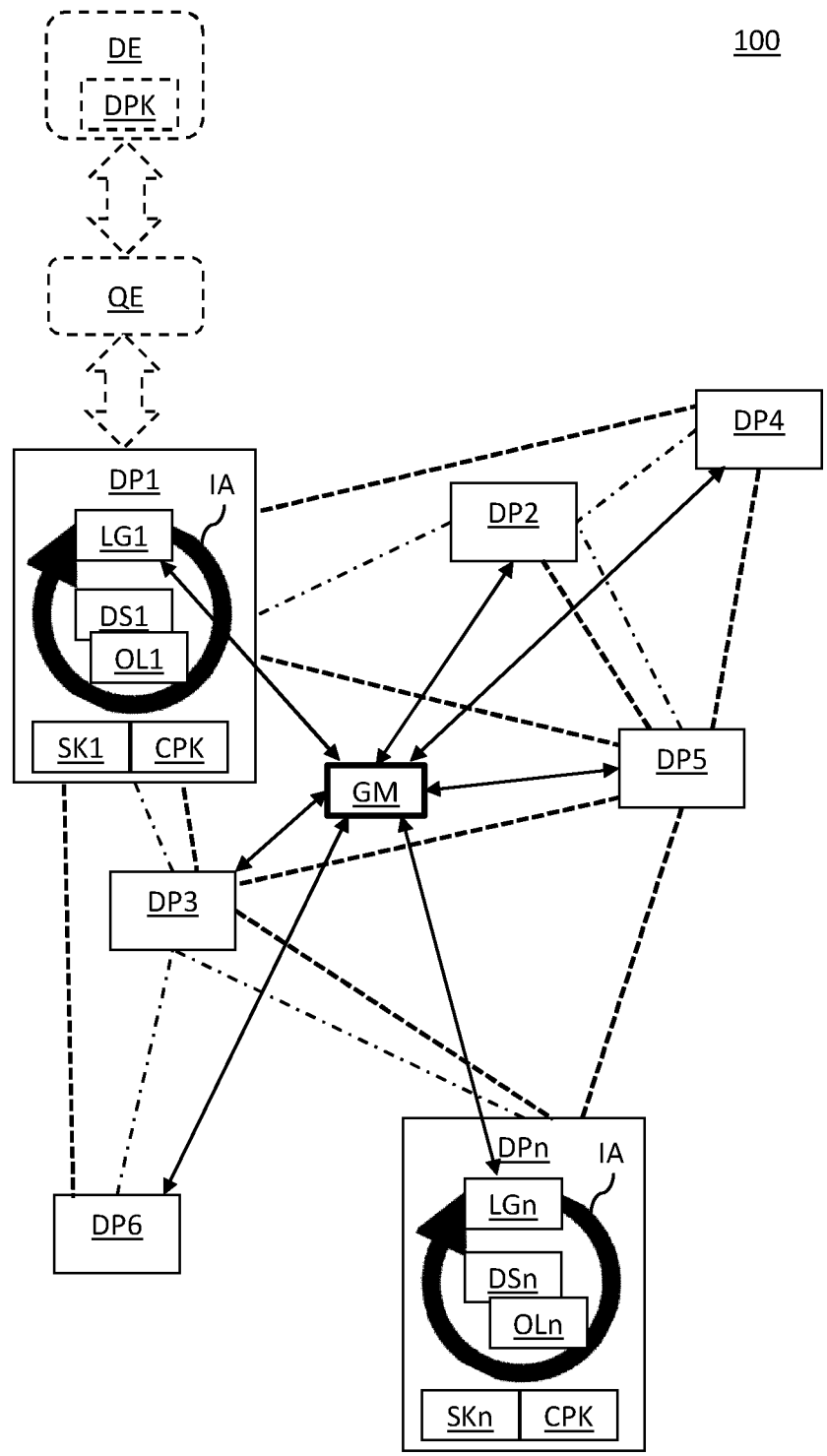
FIG. 1 illustrates a simplified diagram of a distributed computer system for privacy-preserving distributed training of a neural network model according to an embodiment.
Figure 2A:
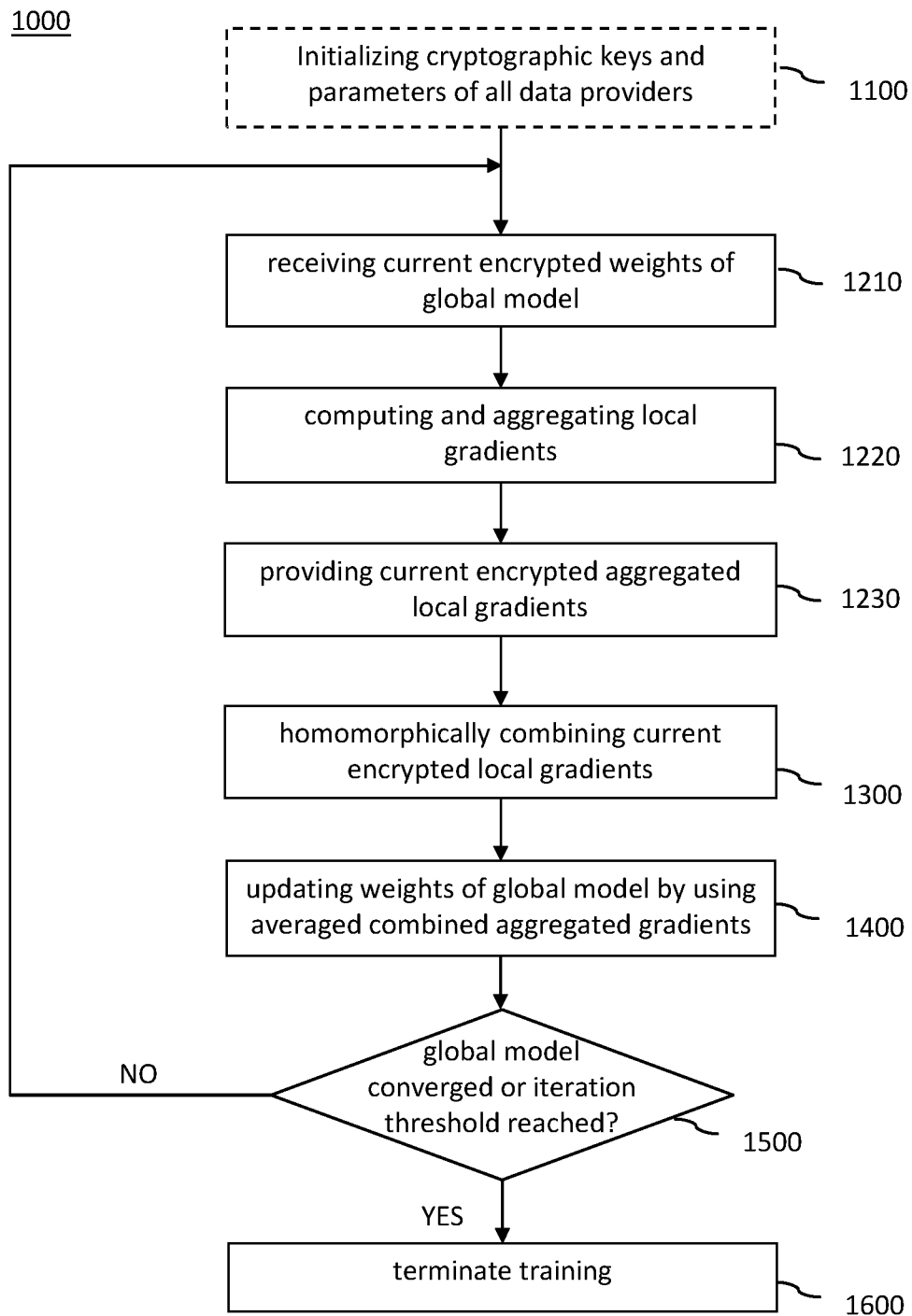
FIG. 2A is a simplified flow chart illustrating a computer-implemented method for privacy-preserving distributed training of a neural network model according to an embodiment.

FIG. 1 includes a simplified block diagram of a distributed computer system 100 for privacy-preserving distributed training of a neural network model (global model GM) on distributed datasets DS1 to DSn according to an example embodiment. FIG. 2A is a simplified flow chart illustrating a computer-implemented method 1000 for privacy-preserving distributed training of the neural network model according to an embodiment. The steps of the method 1000 are performed by respective components of the distributed computer system 100. Therefore, FIG. 1 is described in view of FIG. 2A and the following parts of the description refer to reference numbers of both, FIG. 1 and FIG. 2A. It is to be noted that the reference numbers used in the figures may deviate from corresponding symbols used in formulas and protocols of the description and figures.

The plurality of data providers DP1 to DPn is communicatively coupled such that each data provider can exchange information with any other data provider. In the example, the dashed lines represent physical communication channels between pairs of data providers. In the example, not every data provider is coupled with every other data provider. For example, DP1 is coupled with DP5 but has no direct channel with DP2. However, DP1 can exchange information with DP2 via DP5. The dash-dotted lines represent a tree structure which can be formed when all data providers are connected with each other via respective communication channels for efficiently answering queries, which will be explained later. The double-arrows between the general model GM and each data provider symbolize that each data provider receives 1210 the current encrypted weights of the general model, or can at least access the current general model GM at any time to retrieve such weights.

In the example, only DP1 and DPn are shown with their internal structure. However, the remaining data providers DP2 to DP6 all have the corresponding internal structure. Each DP* ("*" is used as a placeholder for indices 1 to n) has a respective local training dataset DS* (DS1 to DSn) to contribute to the training of the global model GM. An iterative training algorithm IA is used to compute and aggregate 1220, for each layer of the global model GM, encrypted, local gradients LG* of a respective cost function with respect to the weights by processing each sample of a respective local batch of the corresponding local dataset DS* with respective output labels OL*. The data provider systems DP* and their local training datasets DS* and output labels OL* adhere to the same structure and data formats. Further, the same training parameters are used by all data providers for local gradient computation. The plurality of all local training datasets thereby represents a global training dataset for the global model GM.

Each data provider has a portion of a cryptographic distributed secret key SK1 to SKn and a corresponding collective cryptographic public key CPK of a multiparty fully homomorphic encryption scheme. The cryptographic keys SK1 to SKn, CPK are collectively initialized 1100 by the plurality of data providers DS1 to DSn. The initialization step 1100 is only performed once and is therefore executed before the actual training of the global model starts. Further, the weights of the global model are initialized and encrypted with the collective public key CPK in this initialization step. This can be done by one of the data providers.

It is assumed that the data providers are willing to contribute their respective data to train the global model by providing their respective local gradients. It is further assumed that the data providers are all communicatively coupled and organized in a topology that enables efficient execution of the computations. For instance, as depicted in FIG. 1, they can be organized in a tree structure that enables parallelization for query executions. Further, the following description is to be understood in that, in the synchronous mode, all data providers can be seen as a single receiver-subset/single combiner-subset and all operations are performed within a single global iteration loop. In the asynchronous mode, the described operations are performed by a respective receiver-/combiner-subset within a single global iteration loop with multiple global iteration loops being performed asynchronously.

Although the data providers wish to collaborate for the execution of machine learning workflows, they do not necessarily trust each other. As a result, they seek to protect the secrecy of their data (used for training and evaluation) and of the collectively learned global model. More formally, the following security properties must hold in a passive-adversary model, where at least one data provider does not collude with the others.:

(a) Data Confidentiality: The training data of each data provider $DP_i$, i.e., $(X_i, y_i)$ and the querier's evaluation data 160 (X',•) should remain only known to their respective owners. To this end, data confidentiality is satisfied as long as the involved parties (data providers and querying entity) do not obtain any information about other parties' inputs other than what can be deduced from the output of the process of training or evaluating a model.

(b) Model Confidentiality: During the training process, no data provider DP, should gain more information about the model that is being trained than what it can learn from its own input data, i.e., $(X_i, y_i)$. During prediction, the querier should not learn anything more about the model than what it can infer from its input data (X',•) and the corresponding predictions y'.

Figure 3A:
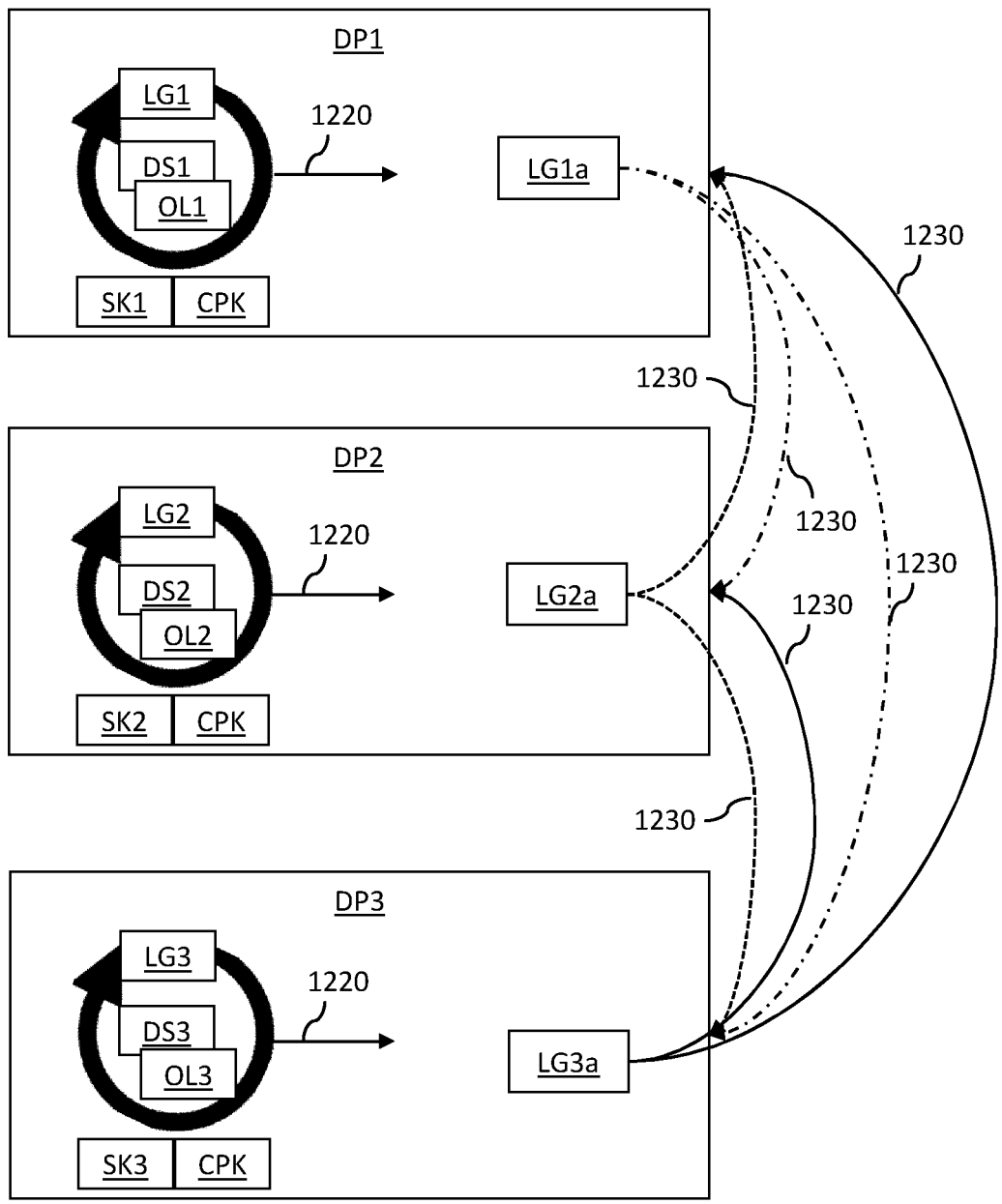
FIG. 3A illustrates training a neural network model according to an embodiment.
Figure 3B:
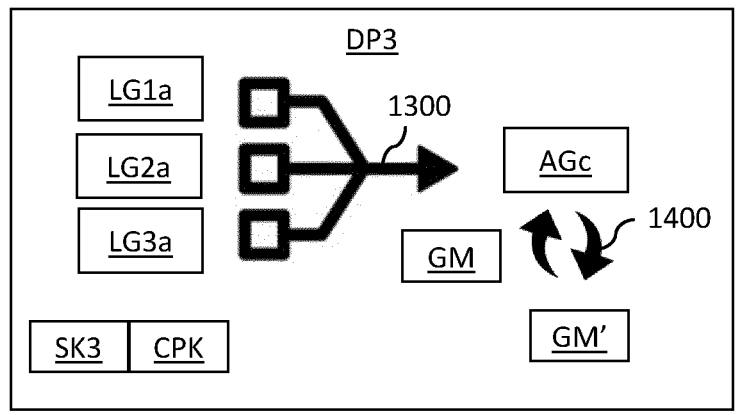
FIG. 3B illustrates homomorphic combination of local gradients and updating a neural network model I according to an embodiment.
Figure 4:
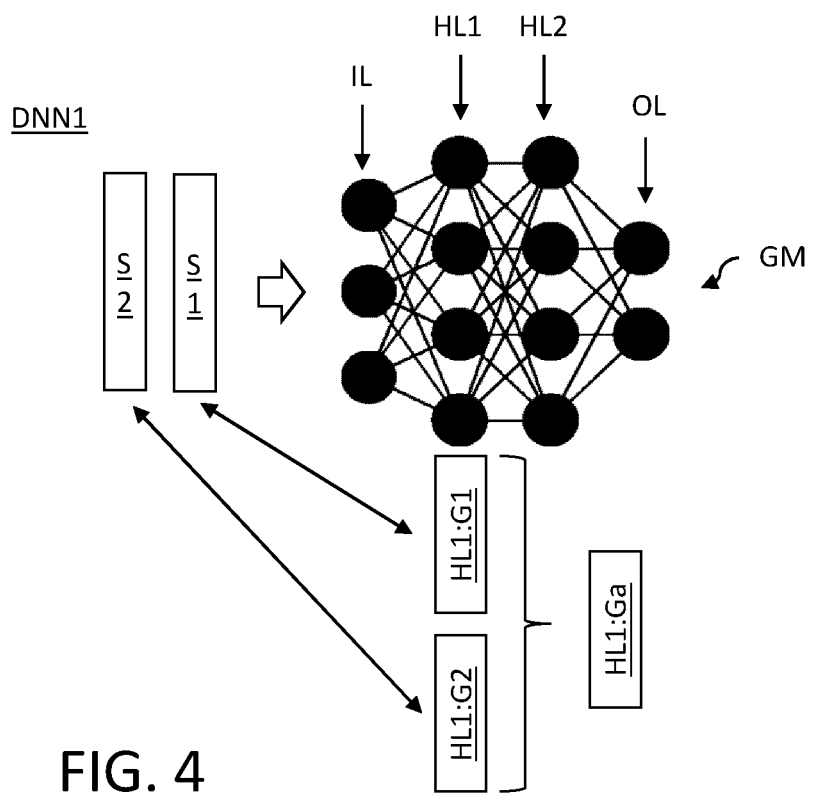
FIG. 4 illustrates and example of local gradient computation by a data provider for a deep neural network.

The data providers (DPs), each of which owns a part of the global training dataset, locally compute and aggregate 1220 encrypted local gradients LG* which are then homomorphically combined 1300 as illustrated in FIGS. 3A, 3B and 4. FIG. 3A illustrates the computation of local gradients LG* for each neural network layer by each data provider DP* for a number of input samples (local batch size). In the example of FIG. 4, the global model GM is implemented by a deep neural network DNN1 which has an input layer IL, two hidden layers HL1, HL2 and an output layer OL, and two input samples S1, S2 are used for the local gradient computation. The input samples include respective records of the local data sets DS* and the corresponding output labels OL*. The local gradients LG* are then aggregated 1220 into the corresponding (encrypted) aggregated local gradients LG*a for each network layer. In the example of FIG. 4, the aggregation for the layer HL1 is performed over the corresponding local gradients HL1:G1, HL1:G2 determined for each of the samples S1, S2 into the aggregated local gradient HL1:G1a. The encrypted aggregated local gradients LG*a are then provided 1230 to one or more other data providers (e.g., DP1→DP2, DP3; DP2→DP1, DP3, etc.)

FIG. 3B shows how at least one DP3 of those other data providers homomorphically combines 1300 the current received encrypted aggregated local gradients LG1a, LG2a of other data providers DP1, DP2 with its own aggregated local gradients LG3a into combined aggregated gradients AGc. The combined aggregated gradients AGc are then used to update the weights of the current global model GM resulting in the updated global model GM'.

Mouchet et al. propose a multiparty version of the Brakerski Fan-Vercauteren (BFV) lattice-based homomorphic cryptosystem and introduce interactive protocols for key generation, decryption, and bootstrapping. In one embodiment, the claimed approach uses an adaptation of this multiparty scheme to the Cheon-Kim-Kim-Song cryptosystem (CKKS) [cf. J. H. Cheon, A. Kim, M. Kim, and Y. Song. Homomorphic encryption for arithmetic of approximate numbers. In Springer International Conference on the Theory and Application of Cryptology and Information Security (ASIACRYPT), 2017] that enables approximate arithmetic, and whose security is based on the ring learning with errors (RLWE) problem [cf. V. Lyubashevsky, C. Peikert, and O. Regev. On ideal lattices and learning with errors over rings. In Springer Annual International Conference on the Theory and Applications of Cryptographic Techniques (EUROCRYPT), 2010.]. In the following, the main parameters of the CKKS cryptographic scheme and the multiparty cryptographic operations are described as used in one embodiment. The cited work of Cheon et al. describes the details of the CKKS cryptoscheme and the work of Mouchet et al. provides the complete definition and security of the distributed protocols.

The CKKS cryptoscheme which is used by the herein disclosed protocols is briefly described in the following. The cyclotomic polynomial ring of dimension N, where N is a power-of-two integer, defines the plaintext and ciphertext space as $R_{Q_L} = \mathbb{Z}[X]/(X^N+1)$, with $Q_L = \Pi_0^L q_i$ in our case. Each $q_i$ is a unique prime, and $Q_L$ is the ciphertext modulus at an initial level L. Note that a plaintext encodes a vector of up to N/2 values. Below, we introduce the main functions that we use in our system. We denote by $c = (c_0, c_1) \in \mathbb{R}_{Q_L}^2$ and $p \in R_{Q_L}$, a ciphertext (indicated as boldface) and a plaintext, respectively. $\bar{p}$ denotes an encoded(packed) plaintext. We denote by $L_c$, $S_c$, L and S the current level of a ciphertext c, the current scale of c, the initial level, and the initial scale (precision) of a fresh ciphertext respectively, and we use the equivalent notations for plaintexts. The functions that start with 'D' are distributed, and executed among all the secret-key-holders, whereas the others can be executed locally by anyone with the public key. SecKeyGen($1^\lambda$): Returns the set of secret keys $\{sk_i\}$, i.e., $k_i$ for each party $P_i$, for a security parameter $\lambda$. DKeyGen($sk_i$)$: Returns the collective public key pk. Encode(msg): Returns a plaintext $\bar{p} \in R_{Q_L}$ with scale S, encoding msg. Decode($\bar{p}$): For $$\bar{p} \in R_{Q_{L_p}}$$

and scale $S_p$, returns the decoding of p. DDecrypt(c,$sk_i$): For $$c \in R_{Q_{L_c}}^2$$

and scale $S_c$, returns the plaintext p $$\in R_{Q_{L_c}}$$

with scale $S_c$. Enc(pk,$\bar{p}$): Returns $c_{pk} \in R_{Q_L}^2$ with scale S such that DDecrypt($c_{pk}$,$sk_i$)≈$\bar{p}$. Add($c_{pk}$,$c'_{pk}$): Returns (c+c')$_{pk}$ at level min ($L_c$, $L_{c'}$) and scale max ($S_c$,$S_{c'}$). Sub($c_{pk}$, $c'_{pk}$): Returns (c−c')$_{pk}$ at level min ($L_c$,$L_{c'}$) and scale max($S_c$,$S_{c'}$). Mul$_{pt}$($c_{pk}$,$\bar{p}$): Returns (c·p)$_{pk}$ at level min($L_c$,$L_p$) and scale $S_c \cdot S_p$. Mul$_{ct}$($c_{pk}$,$c'_{pk}$): Returns (c·c')$_{pk}$ at level min($L_c$,$L_{c'}$) and scale $S_c \cdot S_{c'}$. RotL/R($c_{pk}$,k): Homomorphically rotates $c_{pk}$ to the left/right by k positions. Res($c_{pk}$): Returns $c_{pk}$ with scale $S_c/q_{L_c}$ at level $L_c-1$. SetScale($c_{pk}$,S): Returns $c_{pk}$ with scale S at level $L_c-1$. KS($c_{pk} \in R^3$): Returns $c_{pk} \in R^2$. DKeySwitch($c_{pk}$,pk',{$sk_i$}): Returns $c_{pk'}$. DBootstrap($c_{pk}$,$L_c$,$S_c$, {$sk_i$}): Returns $c_{pk}$ with initial level L and scale S.

Turning briefly to FIG. 3B, at least one data provider of the subset of data providers which performed the homomorphic combination 1300 (e.g., DP3) now updates 1400 the weights of the current global model GM based on the combined gradients AGc. As can be seen in FIG. 2A, the update 1400 is repeated until the predefined number of maximum global iterations is reached. The global iterations loop can also stop earlier if a sufficient training level (convergence) of the global model is already reached with less global iterations. For example, a further protocol agreed amongst the data providers may allow the data providers to obtain respective information about the current state of the global model. In case that such further protocol for executing a test on the current training level of the global model is not available, the predefined maximum number of global iterations may also be implemented as a pre-defined fixed number of global iterations without a stop condition. This stop condition is checked 1500 by the at least one data provider DP3. Once the training of the global model is terminated 1600 it can be used by the data providers for privacy preserving predictions.

To summarize the proposed solution to the problem of privacy-preserving distributed learning for a global neural network model, the MapReduce abstraction is used to capture the parallel and repetitive nature of distributed learning tasks. The workflow of the used extended MapReduce abstraction includes the following four phases: the data providers pre-process their data (PREPARE) before they iteratively compute local gradients based on their local training datasets (MAP). Subsequently, they combine the local gradients (COMBINE) and update the global model (REDUCE). The four phases in one embodiment of the extended MapReduce abstraction are illustrated in protocol 1 of FIG. 5A.

The PREPARE phase includes lines 1 to 5 of protocol 1 (Collective Training). The data providers $P_i$ collectively agree on the training parameters: the learning parameters: the number of hidden layers (l), the number of neurons ($h_j$) in each layer j, j 1, 2, ..., l, the learning rate ($\eta$), the number of global iterations (m), the activation functions to be used in each layer ($\varphi()$) and their approximations, and the local batch size (b). Then, the parties generate their secret keys $sk_i$ and collectively generate the public key pk. Subsequently, they optionally perform a collective normalization or standardization on their input data with a secure aggregation protocol described in "D. Froelicher, J. R. Troncoso-Pastoriza, J. S. Sousa, and J. Hubaux. Drynx: Decentralized, secure, verifiable system for statistical queries and machine learning on distributed datasets. IEEE Transactions on Information Forensics and Security, 15:3035-3050, 2020." Each $P_i$ encodes (packs) its input data samples $X_i$ and output labels $y_i$ as $\overline{X}_i, \overline{y}_i$. Finally, $P_1$ (e.g., the root of the data provider tree) initializes and encrypts the global weights.

The DPs also collectively initialize the cryptographic keys for the distributed CKKS scheme by executing DKeyGen(•). Then, they collectively standardize, or normalize, the distributed dataset by obliviously computing the required statistics. The interactive protocols, i.e., Collective Aggregation and Collective Differential Privacy (CDP), and encodings by Froelicher et al. can be adapted to the herein disclosed approach. These encodings define how the operations are locally executed by the DPs on their part of the dataset, so that the encrypted results can be collectively aggregated, obfuscated and combined to obtain the approximate statistics as if it was computed on the whole dataset. For instance, to standardize the dataset, each DP, for each feature, locally computes the sum of its value, the sum of its squared values, and the number of samples. These values are encrypted and then aggregated among all DPs. Then, the DPs collectively and obliviously add randomly sampled noise from a deviation.

MAP, COMBINE, and REDUCE are repeated m times. During iteration k, in MAP (lines 7 to 10 of protocol 1), each $P_i$ receives the current weights $W_{1,\cdot}^k$ to $W_{l,\cdot}^k$ and performs the local gradient descent computation. In COMBINE (lines 11 to 12 of protocol 1), the local gradient contributions of each $P_i$, are securely combined. In REDUCE (lines 13 to 15 of protocol 1), $P_1$ updates the weights of the global model.

The local gradient descent computation (LGD) in the MAP phase (lines 9 and 10 of protocol 1) is illustrated in more detail in the example protocol 2 of FIG. 5B. Lines 2 to 6 of protocol 2 relate to the forward pass and lines 7 to 14 to the backpropagation. Each $P_i$ performs b forward and backward passes, to compute and aggregate the local gradients, by processing each sample of its respective batch. Protocol 2 describes the LGD steps performed by each party $P_i$, at iteration k; $\odot$ represents an element-wise product and $\varphi'(.)$ the derivative of an activation function. As the protocol refers to one local iteration for a specific data provider, k and i are omitted from the weight and gradient indices. This protocol describes the typical operations for the forward pass and backpropagation using stochastic gradient descent (SGD) with the L2 loss (also known as least squares error LSE). It is to be noted that the operations in protocol 2 are performed over encrypted data.

In the example protocol 1, in the COMBINE phase (lines 11 and 12 of protocol 1), each party communicates its encrypted local gradients to their parent, and each parent homomorphically sums the received gradients with their own ones. At the end of this phase, $P_1$ receives the globally aggregated gradients.

In the example protocol 1, in the REDUCE phase (lines 13 to 15 of protocol 1), $P_1$ updates the global model weights by using the averaged aggregated gradients. The averaging is done with respect to the global batch size B=b×N.

Training Termination: the learning process may be stopped after a predefined number of epochs. Other well-known methods may be used instead as discussed further down below.

At the end of the training phase, the model is kept in an encrypted form such that no individual party or the querier can access the model weights. To enable oblivious inference, the querier encrypts its evaluation data $X_q$ with the parties' collective key. An oblivious inference is equivalent to one forward pass (see Protocol 2), except that the first plaintext multiplication ($Mul_{pt}()$) of $L_0$ with the first layer weights is substituted with a ciphertext multiplication ($Mul_{ct}()$). At the end of the forward pass, the parties collectively re-encrypt the result with the querier's public key by using the key-switch functionality of the underlying MHE scheme. Thus, only the querier is able to decrypt the prediction results. Note that any party $P_i$ can perform the oblivious inference step, but the collaboration between all the parties is required to perform the distributed bootstrap and key-switch functionalities.

Example protocol 3 of FIG. 5C illustrates an implementation for an alternating packing protocol illustrating cryptographic operations for pooling as used by an embodiment. The alternating packing (AP) approach can be used for packing the weight matrices of the global model. In the following, it is explained how activation functions on encrypted values can be enabled and which cryptographic building blocks and functions can be employed in the herein disclosed approach, together with their execution pipeline and their complexity. Finally, a constrained optimization problem is formulated that depends on a cost function for choosing the parameters of the crypto-scheme.

For the efficient computation of the forward pass and backpropagation described in Protocol 2, the packing capabilities of the crypto-scheme enable Single Instruction, Multiple Data (SIMD) operations on ciphertexts. Packing enables coding a vector of values in a ciphertext and to parallelize the computations across its different slots, thus significantly improving the overall performance. Existing packing strategies that are commonly used for machine learning operations on encrypted data (e.g., the row-based or diagonal packing), require a high number of rotations for the execution of the matrix-matrix multiplications and matrix transpose operations, performed during the forward and backward pass of the local gradient descent computation (see Protocol 2).

The number of rotations has a significant effect on the overall training time of a neural network on encrypted data, as they require costly key-switch operations as discussed in the complexity analysis further down below. As an example, the diagonal approach scales linearly with the size of the weight matrices, when it is used for batch-learning of neural networks, due to the matrix transpose operations in the backpropagation.

Herein, a different packing approach is used which processes each batch sample one by one, making the execution embarrassingly parallelizable ("embarrassingly parallel problem" is also referred to as perfectly parallel, delightfully parallel or pleasingly parallel problem in literature). This allows to optimize the number of rotations, to eliminate the transpose operation applied to matrices in the backpropagation, and to scale logarithmically with the dimension and number of neurons in each layer. In other words, the herein disclosed alternating packing approach/strategy enables:

a) better parallelization,
b) reduction in the number of used rotations (which are the bottleneck for complexity),
c) avoiding transpose operations in backpropagation (computationally complex operations), and
d) better scaling with the dimension and number of layers (logarithmic vs linear).

The proposed alternating packing (AP) approach combines row-based and column-based packing, i.e., rows or columns of the matrix are vectorized and packed into one ciphertext. In particular, the weight matrix of every fully connected (FC) layer in the neural network is packed following the opposite approach from that used to pack the weights of the previous layer. With the AP approach, the number of rotations scales logarithmically with the dimension of the matrices, i.e., the number of features (d), and the number of hidden neurons in each layer ($h_i$). For this, the matrices are padded with zeros to get power-of-two dimensions. In addition, the AP approach reduces the computational cost of transforming the packing between two consecutive layers. Protocol 3 depicted in FIG. 5C describes a generic way for the initialization of encrypted weights for an l-layer MLP by $P_1$ and for the encoding of the input ($X_i$) and labels ($y_i$) of each party $P_i$. It takes as inputs the NN parameters: the dimension of the data (d) that describes the shape of the input layer, the number of layers l, the number of hidden neurons in the jth layer ($h_j$), and the number of outputs ($h_l$).

In steps 2-6 of Protocol 3, each party $P_i$ prepares the inputs $X_i$ by replicating and encoding them in vectors. For networks with an odd number of layers, in steps 7-10, each party $P_i$ prepares the labels $y_i$ by introducing a gap of zeros between values. In step 11, each party $P_i$ encodes the labels. "gap" denotes a vector of zeros. "|.|" denotes the size of a vector or the number of rows of a matrix. Replicate(v,k,gap) returns a vector that replicates v, k times with a gap in between each replica. Flatten(W, gap, dim), flattens the rows or columns of a matrix W into a vector and introduces a gap in between each row/column. If a vector is given as input to this function, it places gap in between all of its indices. The argument dim indicates flattening of rows ('r') or columns ('c'), and dim='.' for the case of vector inputs.

Figure 6B:
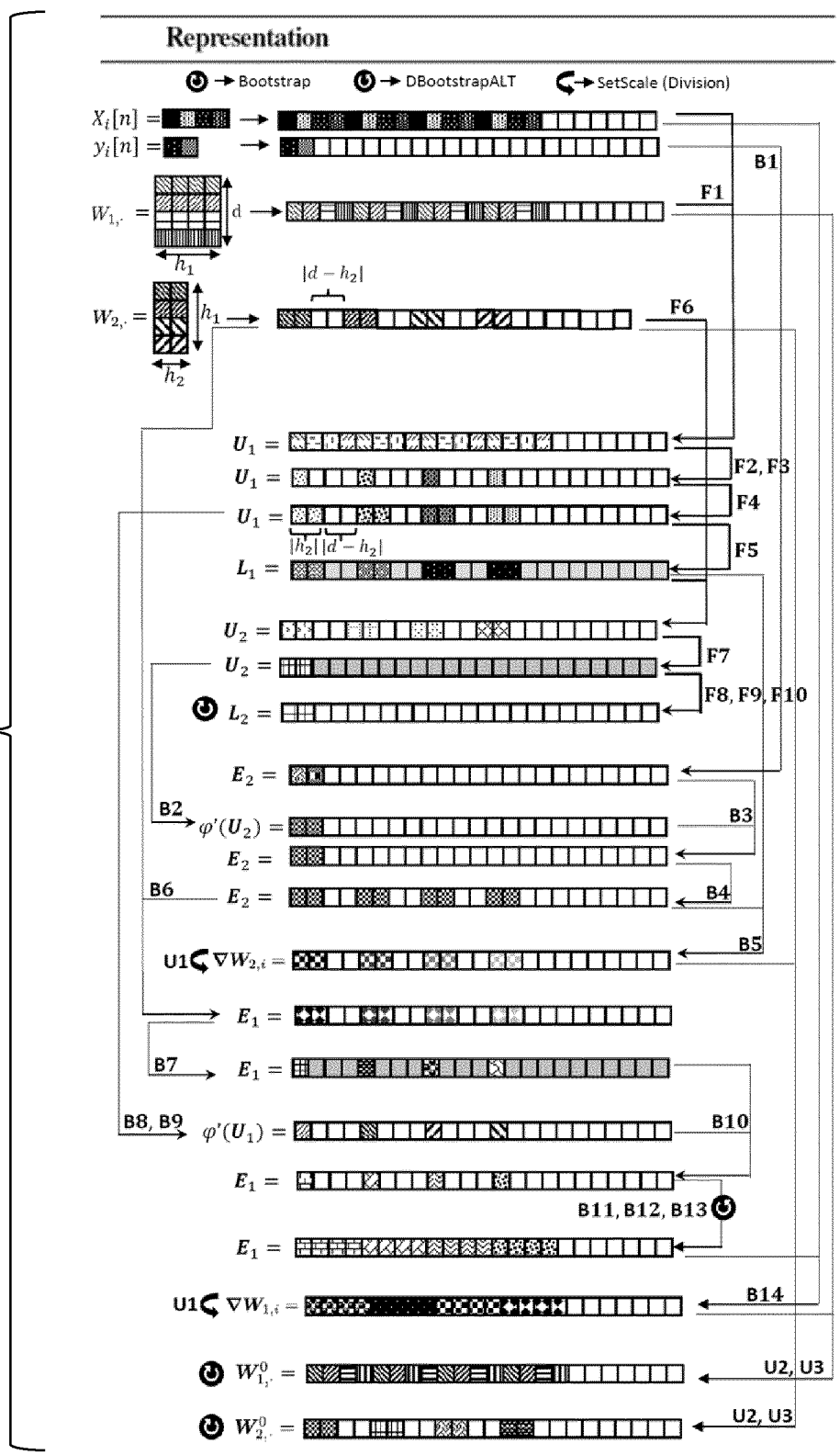

The weight initialization (steps 13 to 28 of Protocol 3) is performed by $P_1$ by doing row-packing for even layers (steps 16 to 20) and column-packing for odd layers (steps 22 to 26). That is, the rows (or columns) packed into one ciphertext are aligned with the rows (or columns) of the following layer for the next layer multiplications in the forward pass and for the alignment of multiplication operations in the backpropagation, as depicted in the table illustrated by FIGS. 6A, 6B (e.g., see steps F1, F6, B3, B5, B6). This alignment is enabled by adding a gap between rows or columns and using rotations, as described in the following embodiments. These steps correspond to the weight initialization and to the input preparation steps of the PREPARE (offline) phase in Protocol 1.

Convolutional Layer Packing.

To optimize the SIMD operations for convolutional (CV) layers, we the nth input sample $X_i[n]$ is decomposed into t smaller matrices that are going to be convoluted with the weight matrix. These decomposed flattened matrices are packed into one ciphertext, with a gap in between each matrix that is defined with respect to the number of neurons in the next layer, similarly to the AP approach. The weight matrix is then replicated t times with the same gap between each replica.

Protocol 5 of FIG. 5E illustrates how to pack a CV layer weight matrix and the input data in case of a convolutional layer. If the next layer is another convolution or downsampling layer, the gap is not needed and the values in the slots are rearranged during the training execution. Protocol 5 describes the offline packing of one CV layer and the input data X when the first layer is a CV layer. It takes X, the initial weight matrix of the first CV layer, the kernel size $h_1$=f×f, the stride s, and the number of neurons in the next layer (h2). Type(i) denotes a function that returns the type of the ith layer as FC, CV, or pooling, whereas Decompose(X,h=f×f,s) decomposes the matrix X into t small matrices according to a kernel size h, and the stride s. The functions Flatten( ) and Replicate( ) were already defined above. The packing for all CV layers of a network is done the same way as described in steps 11-13 of Protocol 5, and the gap is always calculated depending on the number of neurons in the next layer (if it is an FC layer). If the following layer is a CV or downsampling layer, the gap is not needed, as the output of the layer is processed during the distributed bootstrapping.

Downsampling (Pooling) Layers.

As there is no weight matrix for downsampling layers, they are not included in the offline packing phase.

Approximated Activation Functions.

For the encrypted evaluation of non-linear activation functions, such as Sigmoid or Softmax, least-squares approximations may be used. Further, the optimized polynomial evaluation (cf. D. Froelicher, J. R. Troncoso-Pastoriza, A. Pyrgelis, S. Say, J. S. Sousa, J.-P. Bossuat, and J.-P.

Hubaux. Scalable privacy-preserving distributed learning, 2020) that consumes $\log(d_a+1)$ levels for an approximation degree $d_a$. For the piece-wise function ReLU, we approximate the smooth approximation of ReLU, softplus (SmoothReLU), $\varphi(x)=\ln(1+e^x)$ with least-squares. Lastly, derivatives of the approximated functions can be used.

To achieve better approximation with the lowest possible degree, two approaches may be applied to keep the input range of the activation function as small as possible, by using (i) different weight initialization techniques for different layers (i.e., Xavier or He initialization), and (ii) collective normalization of the data by sharing and collectively aggregating statistics on each party's local data in a privacy-preserving way.

For the piece-wise function ReLU, the following alternatives may be used:
(i) approximation of square-root for the evaluation of $\varphi(x)=0.5(b+\sqrt{b^2})$ that is equivalent to ReLU, and
(ii) (ii) approximating the smooth approximation of ReLU (SmoothReLU), or softplus, $\varphi(x)=\ln(1+e^x)$, both with least-squares.

The latter achieves a better approximation for a degree $d_a=3$, whereas the former approximates better the exact ReLU if one increases the multiplicative depth by 1 and uses $d_a=7$. In our evaluations, we use SmoothReLU for efficiency.

We note that the derivative of softplus is a sigmoid function, and we evaluate the approximated sigmoid as the derivative, as this achieves better accuracy. Finally, functions can also be approximated by using Chebyshev interpolants, implementing a level- and product-efficient algorithm to evaluate polynomials in standard or Chebyshev basis. The least-squares is the optimal solution for minimizing the squared error over an interval, whereas Chebyshev asymptotically minimizes the maximum error. Hence, Chebyshev is more appropriate for keeping the error bounded throughout the whole interval, but requires a larger degree for a high accuracy approximation.

Finally, the interval and the degree of the approximations are chosen based on the heuristics on the data distribution in a privacy-preserving way, as described in "E. Hesamifard, H. Takabi, M. Ghasemi, and R. Wright. Privacy-preserving machine learning as a service. Proceedings on Privacy Enhancing Technologies, 2018:123-142, 06 2018."

Cryptographic Building Blocks.

In the following, each cryptographic function used in an example embodiment to enable the privacy-preserving training of NNs with N parties is described. Further, the optimizations employed to avoid costly transpose operations in the encrypted domain is discussed.

Rotations.

When relying on packing capabilities, computation of the inner-sum of vector-matrix multiplications and transpose operation implies a restructuring of the vectors, that can only be achieved by applying slot rotations. In the herein disclosed embodiments, two types of rotation functions are used: (i) Rotate For Inner Sum (RIS(c,p,s)) is used to compute the inner-sum of a packed vector c by homomorphically rotating it to the left with RotL(c,p) and by adding it to itself iteratively $\log 2(s)$ times, and (ii) Rotate For Replication (RR(c,p,s)) replicates the values in the slots of a ciphertext by rotating the ciphertext to the right with RotR(c,p) and by adding to itself, iteratively $\log 2(s)$ times. For both functions, p is multiplied by two at each iteration, thus both yield $\log 2(s)$ rotations. As rotations are costly cryptographic functions, and the matrix operations required for NN training require a considerable amount of rotations, the number of executed rotations can be minimized by leveraging a modified bootstrapping operation, that automatically performs some of the required rotations.

Distributed Bootstrapping with Arbitrary Linear Transformations.

To execute the high-depth homomorphic operations required for training NNs, bootstrapping is required several times to refresh a ciphertext, depending on the initial level L.

In one embodiment, a distributed version of bootstrapping is used (cf. C. Mouchet, J. R. Troncoso-Pastoriza, J.-P. Bossuat, and J. P. Hubaux. Multiparty homomorphic encryption: From theory to practice. In Technical Report https://eprint.iacr.org/2020/304, 2019), as it is several orders of magnitude more efficient than the traditional centralized bootstrapping. It is however modified, to leverage on the interaction to automatically perform some of the rotations, or pooling operations, embedded as transforms in the bootstrapping.

Mouchet et al. replace the expensive bootstrap circuit by a one-round protocol where the parties collectively switch a Brakerski/Fan-Vercauteren (BFV) ciphertext [cf. J. Fan and F. Vercauteren. Somewhat practical fully homomorphic encryption. Cryptology ePrint Archive, Report 2012/144, 2012. https://eprint.iacr.org/2012/144] to secret-shares in $\mathbb{Z}_t^N$. Since the BFV encoding and decoding algorithms are linear transformations, they can be performed without interaction on a secret-shared plaintext. Despite its properties, the protocol that Mouchet et al. propose for the BFV scheme cannot be directly applied to CKKS, as CKKS is a leveled scheme. The re-encryption process extends the residue number system (RNS) basis from Q to $Q_L$. Modular reduction of the masks in Q will result in an incorrect encryption. A solution to this limitation is to collectively switch the ciphertext to a secret-shared plaintext with statistical indistinguishability.

FIG. 5D illustrates example protocol 4 as DBootstrapALT( ) that takes as inputs a ciphertext $c_{pk}$ at level t' encrypting a message msg and returns a ciphertext $c'_{pk}$ at level L encrypting $\phi(msg)$, where $\phi(.)$ is a linear transformation over the field of complex numbers. "$\|a\|$" denotes the infinity norm of the vector or polynomial a. As the security of the RLWE is based on computational indistinguishability, switching to the secret-shared domain does not hinder security.

Optimization of the Vector-Transpose Matrix Product

The backpropagation step of the local gradient computation at each party requires several multiplications of a vector (or matrix) with the transposed vector (or matrix) (see Lines 11-13 of Protocol 2). The naïve multiplication of a vector v with a transposed weight matrix $W^T$ that is fully packed in one ciphertext, requires converting W of size g×k, from column-packed to row-packed. This is equivalent to applying a permutation of the plaintext slots, that can be expressed with a plaintext matrix $W_{gk\times gk}$ and homomorphically computed by doing a matrix-vector multiplication. As a result, a naïve multiplication requires $\sqrt{g\times k}$ rotations followed by $\log 2(k)$ rotations to obtain the inner sum from the matrix-vector multiplication. Various implementations may be used to reduce the number of rotations when computing the multiplication of a packed matrix (to be transposed) and a vector:

In one implementation, for the mini-batch gradient descent, no operations are performed on the batch matrix. Instead, each batch sample is processed in parallel, because having separate vectors (instead of a matrix that is packed into one ciphertext) enables to reorder them at a lower cost. This approach translates I matrix transpose operations to be transposes in vectors (the transpose of the vectors representing each layer activations in the backpropagation, see Line-13, Protocol 2).

Instead of taking the transpose of the weight matrix, one replicates the values in the vector that will be multiplied with the transposed matrix (for the operation in Line-11, Protocol 2), leveraging the gaps between slots with the AP approach. That is, for a vector v of size k and the column-packed matrix W of size g k, v has the form [a, 0, 0, 0 . . . , b, 0, 0, 0, . . . , c, 0, 0, 0, . . . ] with at least k zeros in between the non-zero a, b, c, . . . values (due to Protocol 3). Hence, any resulting ciphertext requiring the transpose of the matrix that will be subsequently multiplied, will also include gaps in between values. We apply RR(v,1,k) that consumes log 2(k) rotations to generate [a, a, a, . . . 0 . . . , b, b, b, . . . , 0 . . . , c, c, c, . . . , 0, . . . ]. Finally, we compute the product P=Mul$_{cf}$(v,W) and apply RIS(P,1,g) to get the inner sum with log 2(g) rotations. Further, the performance is optimized by using DBootstrapALT( )(Protocol 4): If the ciphertext before the multiplication must be bootstrapped, we embed the log 2(k) rotations as a linear transformation performed during the bootstrapping.

Execution Pipeline

Table 601-602 (concatenation of the sub-tables 601, 602 in FIGS. 6A, 6B) depicts an example execution pipeline of the operations for processing one sample in local gradient descent (LGD) computation for a 2-layer MLP. Sub-table 601 includes a procedural description of the whole process, whereas sub-table 602 includes a graphical description of the packing and embedding of the input and intermediate values in plaintext and ciphertext vectors. Different fill patterns in sub-table 602 represent the repetition coding of different elements within each packed vector. These steps can be extended to an l-layer MLP by following the same operations for multiple layers. The weights are encoded and encrypted using the AP approach (Protocol 3), and the shape of the packed ciphertext for each step is shown in the representation column (sub-table 602). In the PREPARE phase (steps 1-4 in sub-table 601), each party $P_i$ encodes the inputs and labels, and initializes the weight matrices following the Alternating Packing (AP) Protocol (Protocol 3), by vectorizing them and introducing the appropriate gaps.

In the forward pass (steps F1-F10 in sub-tables 601 and 602), each $P_i$ evaluates the two layers for their inputs $X_i$, by performing ciphertext-plaintext vector-matrix products (in the first layer) and ciphertext-ciphertext vector-matrix products (in all other layers), rescalings and rotations, and evaluating the activation function at each layer. Steps F1-F5 correspond to the first layer, and steps F6-F10 correspond to the second layer. We introduce a distributed bootstrap (DBootstrap(.)) step in F9, right before the last activation function. For networks with more than two layers, this step can be introduced at several layers, depending on the used parameterization and complexity trade-off. In the backward pass (steps B1-B14 in sub-tables 601 and 602), each $P_i$ computes the gradient vectors for the coefficients of the two layers, by using the values computed in the forward pass and their prepared labels $y_i$. This is done by performing ciphertext-ciphertext vector-matrix products, rescalings, rotations, and a final averaging. Steps B1-B5 correspond to the second (last) layer, and steps B6-B14 correspond to the first layer. We introduce a bootstrap operation at the end of the first layer (DBootstrapALT(.)), in B11. Each forward and backward pass on a layer in the pipeline consumes one Rotate For Inner Sum (RIS(•)) and one Rotate For Replication (RR(•)) operation, except for the last layer, as the labels are prepared according to the shape of the t-th layer output. In Table 601-602, it is assumed that the initial level L=7. When a bootstrapping function is followed by a masking (that is used to eliminate unnecessary values during multiplications) and/or several rotations, these operations are performed embedded as part of the distributed bootstrapping (DBootstrapALT( ) to minimize their computational cost. The steps B11, B12, and B13 are the operations embedded in the DBootstrapALT( ) The complexity of each cryptographic function is analyzed in the complexity analysis section further down.

Finally, steps U1-U3 in table 601-602 represent the REDUCE step performed at $P_1$. The COMBINE step is omitted, as it is composed of just a homomorphic addition of the computed local gradients. After it, $P_1$ rescales the gradients, adds them to the global model, and bootstraps the result, that is then used for the next iteration.

Convolutional Layers.

As the kernel is flattened, replicated, and packed in one ciphertext, a CV layer follows the exact same execution pipeline as an FC layer. However, the number of RIS(•) operations for a CV layer is smaller than for an FC layer. That is because the kernel size is usually smaller than the number of neurons in an FC layer. For a kernel of size h=f x f, the inner sum is calculated by $\lceil \log_2(f) \rceil$ rotations. Note that when a CV layer is followed by an FC layer, the output of the $i^{th}$ CV layer (Li) already gives the flattened version of the matrix in one ciphertext. RR($L_i$,1,$h_i$+1) is applied for the preparation of the next layer multiplication. When a CV layer is followed by a pooling layer, however, the RR(•) operation is not needed, as the pooling layer requires a new arrangement of the slots of Li. This costly operation can be avoided by passing Li to DBootstrapALT(.), and by embedding both the pooling and its derivative in DBootstrapALT(.).

Pooling Layers.

The system is evaluated based on average pooling as it is the most efficient type of pooling that can be evaluated under encryption. To do so, the modified collective bootstrapping is exploited to perform arbitrary linear transformations. Indeed, the average pooling is a linear function, and so is its derivative (note that this is not the case for the max pooling). Therefore, in the case of a CV layer followed by a pooling layer, DBootstrapALT(•) is applied and is used to rearrange the slots and to compute the convolution of the average pooling in the forward pass and its derivative used later in the backward pass. For a h=fxf kernel size, this saves $\lceil \log_2(h) \rceil$ rotations and additions (RIS(•)) and one level if masking is needed. For max/min pooling, which are non-linear functions, evaluating these functions by using encrypted arithmetic remains unpractical due to the need of high-precision approximations.

Complexity Analysis

Table 700 of FIG. 7 displays the communication and worst-case computational complexity of the building blocks of the claimed system. This includes the MHE primitives, thus facilitating the discussion on the parameter selection in the following section. The complexity is defined in terms of key-switch KS(.) operations. This is a different operation than DKeySwitch(•) explained in in the context of the Multiparty Homomorphic Encryption (MHE). KS(•) and DBootstrap(•) are 2 orders of magnitude slower than an addition operation, rendering the complexity of an addition negligible.

N, $\alpha$, L, $L_c$, $d_a$ stand for the cyclotomic ring size, the number of secondary moduli used during the key-switching, maximum level, current level, and the approximation degree, respectively.

$$\beta = \lceil L_c \rceil + \frac{1}{\alpha}, m = \lceil \log(d_a + 1) \rceil, \kappa = \lfloor m/2 \rfloor.$$

The communication complexity of the system depends solely on the number of parties (N), the number of total ciphertexts sent in each global iteration (z), and the size of one ciphertext (c). The building blocks that do not require communication are indicated as "-". In table 700, forward and backward passes represent the per-layer complexity for FC layers, so they are an overestimate for CV layers. The number of multiplications differs in a forward pass and a backward pass, depending on the packing scheme, e.g., if the current layer is row-packed, it requires 1 less $\text{Mul}_{ct}(\cdot)$ in the backward pass, and one has 1 less $\text{Mul}_{pt}(\cdot)$ in several layers, depending on the masking requirements. Furthermore, the last layer of forward pass and the first layer of backpropagation take 1 less RR($\cdot$) operation that is gained from packing the labels in the offline phase, depending on the NN structure (see Protocol 3). Hence, $2 \log_2(h_l)$ rotations per one LGD computation can be saved.

In the MAP phase, the complexity of the local computations per $P_i$ is provided, depending on the total number of layers I. In the COMBINE phase, each $P_i$ performs an addition for the collective aggregation of the gradients in which the complexity is negligible. To update the weights, REDUCE is done by one party ($P_1$) and divisions do not consume levels when performed with SetScale($\cdot$).

The complexity of an activation function ($\varphi(\cdot)$) depends on the approximation degree $d_a$. The derivative of the activation function ($\varphi(\cdot)$) has the same complexity as $\varphi(\cdot)$ with degree $d_a - 1$. For the cryptographic primitives represented in table 700, the CKKS variant of the MHE cryptosystem is used, and the dominating terms are reported. The distributed bootstrapping takes 1 round of communication and the size of the communication scales with the number of parties (N) and the size of the ciphertext.

Parameter Selection

Firstly, several details are discussed to optimize the number of Res($\cdot$) operations and give a cost function which is computed by the complexities of each functionality presented in table 700. Finally, relying on this cost function an optimization problem is formulated for choosing the system parameters.

It is assumed that each multiplication is followed by a Res($\cdot$) operation. The number of total rescaling operations, however, can be further reduced by checking the scale of the ciphertext. When the initial scale S is chosen such that Q/S=r for a ciphertext modulus Q, the ciphertext is rescaled after r consecutive multiplications. This reduces the level consumption and is integrated into the cost function hereinafter.

Cryptographic Parameters Optimization.

The overall complexity of an l-layer MLP aiming to formulate a constrained optimization problem for choosing the cryptographic parameters is defined. Firstly, the total number of bootstrapping operations ($\mathcal{B}$) required in one forward and backward pass is introduced, depending on the multiplicative depth as $$\mathcal{B} = \frac{\ell(5 + \lceil \log_2(d_a + 1) \rceil + \lceil \log_2(d_a) \rceil)}{(L - \tau)r}, \text{ where } r = Q/S,$$

for a ciphertext modulus Q and an initial scale S.

The number of total bootstrapping operations is calculated by the total number of consumed levels(numerator), the level requiring a bootstrap (L−τ) and r which denotes how many consecutive multiplications are allowed before rescaling (denominator). The initial level of a fresh ciphertext L has an effect on the design of the protocols, as the ciphertext should be bootstrapped before the level $L_c$ reaches a number (L−τ) that is close to zero, where r depends on the security parameters. For a cyclotomic ring size, the initial level of a ciphertext L, and for the fixed neural network parameters such as the number of layers I, the number of neurons in each layer $h_1, h_2, \ldots, h$, and for the number of global iterations m, the overall complexity is defined as $$C(\mathcal{N}, L) = m\left( \sum_{i=1}^{\ell} \{(2\log_2(h_{i-1}) + \log_2(h_{i+1})) \cdot KS + 3Mul_{ct} + 2Mul_{pt} + \varphi + \varphi'\} - 2\log_2(h_\ell) + \mathcal{B} \cdot DB \right)$$

The complexity of each KS(.) operation depends on the level of the ciphertext that it is performed on (see table 700), but the initial level L is used in the cost function for the sake of clarity. The complexity of $\text{Mul}_{ct}$, $\text{Mul}_{pt}$, DB, and KS is defined in 700. Then, the optimization problem for a fixed scale (precision) S and a security level X, which defines the security parameters, can be formulated as $$\min_{\mathcal{N}, L} C(\mathcal{N}, L) \quad (1)$$

subject to mc = $\{q_1, \ldots, q_L\}$; L = |mc|; $Q = \prod_{i=1}^{L} q_i$; $Q = kS$, $k \in \mathbb{R}^+$; $Q_{L-\tau} > 2^\lambda |\text{plaintext}| N$; $\mathcal{N} \leftarrow \text{postQsec}(Q, \lambda)$, where postQsec(Q,L,λ) gives the necessary cyclotomic ring size, depending on the ciphertext modulus (Q) and on the desired security level (X), according to the homomorphic encryption standard whitepaper [cf. M. Albrecht, M. Chase, H. Chen, J. Ding, S. Goldwasser, S. Gorbunov, S. Halevi, J. Hoffstein, K. Laine, K. Lauter, S. Lokam, D. Micciancio, D. Moody, T. Morrison, A. Sahai, and V. Vaikuntanathan. Homomorphic Encryption Security Standard. Technical report, HomomorphicEncryption.org, November 2018].

Eq. (1) gives the optimal N and L for a given NN structure. Then, each weight matrix is packed into one ciphertext. It is worth mentioning that the solution might give an N that has fewer slots than the required number to pack the big weight matrices in the neural network. In this case, a multi-cipher approach may be used to pack the weight matrix using more than one ciphertext and do the operations in parallel.

Multi-cipher Approach.

In the case of a big weight matrix, the flattened weight vector is divided into multiple ciphertexts and the neural network operations are carried out on several ciphertexts in parallel. E.g., for a weight matrix of size 1,024×64 and N/2=4,096 slots, we divide the weight matrix into 1,024×64/4,096=16 ciphers.

Figure 2B:
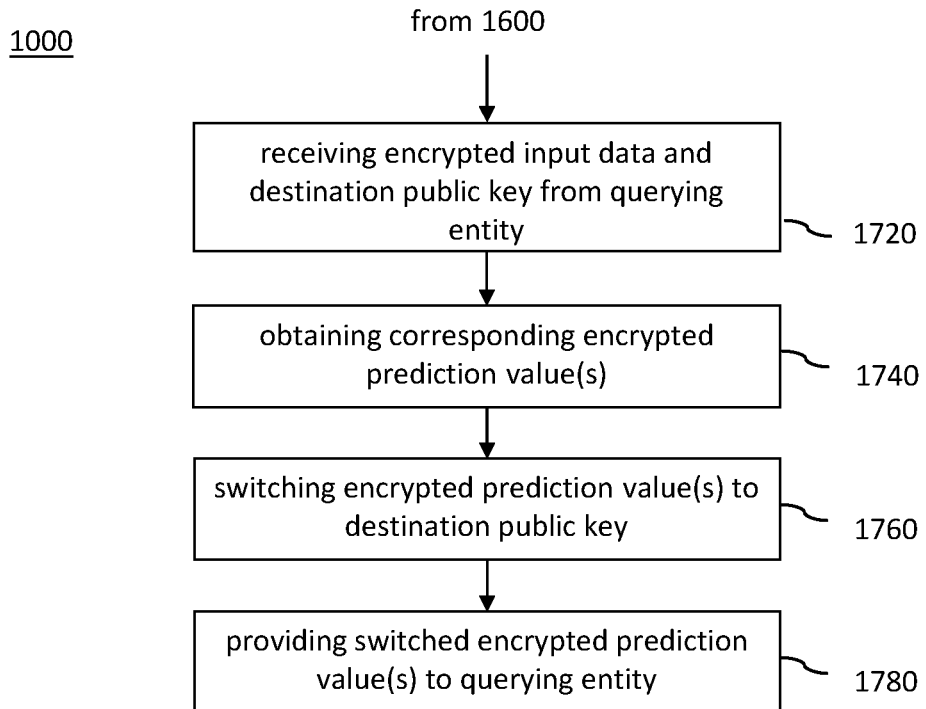
FIGS. 2B, 2C illustrate two alternative methods for enabling prediction based on the trained neural network model according to an embodiment.
Figure 2C:
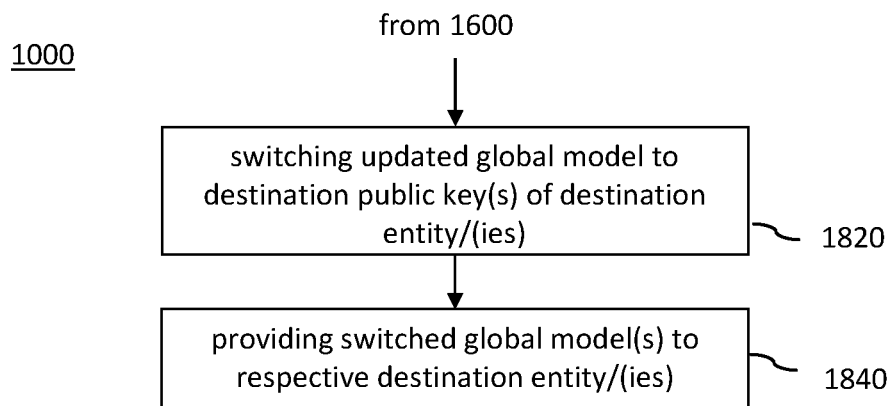

FIGS. 2B and 2C illustrate two alternative embodiments which allow predictions based on the trained global model GM such that secrecy of the input data can be guaranteed.

In the embodiment of FIG. 2B, the protected (encrypted) global model is used by one data provider DP1 to perform predictions in response to a query received 1720 from a querying entity QE (cf. FIG. 1). The query including encrypted input data P(X) (encrypted with the collective public key CPK), and further includes a destination public key DPK of a destination entity DE (cf. FIG. 1). The destination entity is the recipient of the prediction result to be provided in response to the input data. The destination entity DE can be different from the query entity QE (or they may be identical). The querying entity can be any of the data providers or it can be an entity which is not forming part of the plurality of data providers.

In response to the input data, the receiving data provider DP1 obtains 1740 one or more corresponding encrypted prediction values by applying the encrypted global model to the encrypted input data. Finally, the data provider DP1 switches 1760 the one or more encrypted prediction values to the destination public key, and provides 1780 the switched one or more encrypted prediction values to the querying entity QE so that only the destination entity DE can decrypt the one or more encrypted prediction values.

The input data (X',•) of the querying entity is encrypted with the collective public key pk. Then, a forward pass is executed with the global model neural network, following the Alternate Packing approach: the encrypted X' is multiplied with the weights of the trained model's first layer $W_1$, and processed through the activation function in the first layer $\varphi_1(•)$; the results subsequently pass through the next layers (through $W_i$, $\varphi_i(•)$, with i=2, . . . , l), until obtaining the encrypted prediction values from the result of the last layer y' (one prediction per row of X'). The prediction results encrypted under CPK are then switched to the destination public key DPK using DKeySwitch(•), so that only the destination entity can decrypt them.

In more general words, the encrypted model W is used by one DP to perform predictions (y') on the querier's encrypted evaluation data X and the querying entity cannot learn anything more about the model apart from what it can infer from its input data (X',•) and the corresponding predictions y'.

FIG. 2C illustrates an alternative embodiment for enabling predictions through a destination entity DE. In this embodiment, a particular data provider who is in possession of the current encrypted global model, and who knows one or more destination public keys of one or more destination entities, can switch 1820 the entire current (updated) global model to the one or more destination public keys. The resulting one or more switched global models are then provided 1840 to the respective destination entities for obtaining the corresponding decrypted global model. Once a destination entity is in possession of the clear text global model, it can perform predictions on that model with clear text input data without any risk of being eavesdropped because the predictions can be run within the secure environment of the destination entity. Thereby, it makes no difference whether the switched global model is provided directly to the destination entity or via a querying entity as an intermediate because the destination entity is finally running the prediction within its own secure environment.

The invention claimed is:

1. A computer-implemented method for privacy-preserving distributed training of a neural network global model on local datasets, the method comprising:
    (a) receiving, via each data provider of at least a receiver-subset of data providers of a communicatively coupled plurality of data providers, current encrypted weights of the neural network global model, wherein:
        each data provider of the plurality of data providers holds one local dataset of the local datasets, a vector of output labels, and a portion of a cryptographic distributed secret key and a corresponding collective cryptographic public key of a multiparty fully homomorphic encryption scheme,
        the cryptographic distributed secret key and the corresponding collective cryptographic public key are collectively initialized by the plurality of data providers,
        the local datasets and the output labels of each data provider of the plurality of data providers adhere to a structure and a set of data formats and use a set of training parameters, and
        the local datasets represent a global training dataset for the neural network global model with weights of the neural network global model being initialized and encrypted with the collective cryptographic public key to form the current encrypted weights of the neural network global model;
    (b) computing and aggregating, via each data provider of the at least a receiver-subset of data providers of the plurality of data providers, encrypted local gradients of a respective cost function with respect to the current encrypted weights by processing each sample of a respective local batch of data samples of the local dataset with respective output labels, with forward pass and backpropagation using stochastic gradient descent, for each layer of the neural network global model to form current encrypted aggregated local gradients, wherein a local batch size is a number of data samples processed;
    (c) providing, via each data provider of the at least a receiver-subset of data providers of the plurality of data providers, the current encrypted aggregated local gradients to at least a combiner-subset of data providers of the plurality of data providers;
    (d) homomorphically combining at least a subset of the current encrypted aggregated local gradients by at least one of the combiner-subset of data providers of the plurality of data providers into encrypted combined aggregated gradients; and
    (e) updating, by the at least one of the combiner-subset of data providers of the plurality of data providers, the weights of the neural network global model by using encrypted averaged combined aggregated gradients to generate an updated neural network global model, wherein averaging is performed with respect to a global batch size, wherein the global batch size is a dot product between the local batch size and a number of data providers,
    wherein steps (a)-(e) are performed for a predefined maximum number of global iterations,
    wherein the multiparty fully homomorphic encryption scheme is a quantum-resistant cryptographic scheme relying on parallel computations, single-instruction-multiple-data operations, and optimized polynomial approximations of activation functions of machine learning models.

2. The method of claim 1, further comprising:
    receiving, via a particular data provider of the plurality of data providers, from a querying entity, encrypted input data that is encrypted with the collective cryptographic public key, and receiving a destination public key of a destination entity, the destination entity being a recipient of a prediction result to be provided in response to receiving the encrypted input data;

in response to receiving the encrypted input data, obtaining one or more corresponding encrypted prediction values by applying the neural network global model to the encrypted input data; and switching the one or more encrypted prediction values to the destination public key to generate switched one or more encrypted prediction values, and providing the switched one or more encrypted prediction values to the querying entity so that only the destination entity can decrypt the switched one or more encrypted prediction values.

3. The method of claim 1, further comprising:

switching the updated neural network global model to the destination public key of one or more destination entities to generate a switched neural network global model, and providing the switched neural network global model to respective destination entities for obtaining a corresponding decrypted neural network global model.

4. The method of claim 1, wherein at least a subset of the local datasets is encrypted with the collective cryptographic public key, and wherein input data samples and output labels of at least a subset of the data providers are encrypted with the collective cryptographic public key.

5. The method of claim 1, wherein the method is operated in a synchronous mode with the receiver-subset of data providers of the plurality of data providers and the combiner-subset of data providers of the plurality of data providers computing their local gradients in a single global iteration loop.

6. The method of claim 1, wherein the method is operated in an asynchronous mode with a first data provider of the receiver-subset of data providers of the plurality of data providers computing its local gradients in a first global iteration loop, and a second data provider of the receiver-subset of data providers of the plurality of data providers computing its local gradients in one or more additional global iteration loop until all data providers of the plurality of data providers have contributed their local gradient computations.

7. The method of claim 1, wherein the computation of the forward pass and backpropagation uses a crypto-scheme with an alternating packing strategy by iteratively processing each data sample of the local batch of data samples, wherein alternating packing combines row-based and column-based packing, by vectorizing rows or columns of a weight matrix and packing vectorized rows or columns into at least one ciphertext.

8. The method of claim 7, wherein the layers in the neural network global model alternate between row-based packing and column-based packing.

9. The method of claim 1, wherein homomorphically combining the current encrypted aggregated local gradients is performed ascending a tree structure having a root node, one or more parent nodes, and one or more child nodes, such that each data provider of the plurality of data providers combines its current encrypted local gradients with the current encrypted local gradients of the one or more child nodes, and sends the combined result to the one or more parent nodes so that the data provider at the root node of the tree structure combines the combined results and updates the weights of the combined aggregated gradients.

10. A distributed computer system for privacy-preserving distributed training of a neural network global model on a plurality of local datasets, the system comprising:

a plurality of data providers communicatively coupled such that each data provider of the plurality of data providers can exchange information with any other data provider of the plurality of data providers, wherein each data provider of the plurality of data providers:

holds its own local dataset and a vector of output labels for training the neural network global model using an iterative training algorithm, and has a portion of a cryptographic distributed secret key and a corresponding collective cryptographic public key of a multiparty fully homomorphic encryption scheme, wherein the cryptographic keys are collectively initialized by the plurality of data providers, wherein the local training datasets of the plurality of data provider adhere to a structure and a set of data formats and use a set of training parameters, and the local datasets represent a global training dataset for the neural network global model with weights of the neural network global model being initialized and being encrypted with the collective cryptographic public key to form current encrypted weights of the neural network global model;

wherein each data provider of at least a receiver-subset of data providers of the plurality of data providers is configured to:

receive the current encrypted weights of the neural network global model, and compute and aggregate, for each layer of the neural network global model, encrypted local gradients of a respective cost function with respect to the current encrypted weights by processing each data sample of a respective local batch of data samples the local dataset with respective output labels, with forward pass and backpropagation using stochastic gradient descent to form current encrypted aggregated local gradients, wherein a local batch size is a number of data samples processed at an iteration, and to provide the current encrypted aggregated local gradients to at least a combiner-subset of data providers of the plurality of data providers; and wherein the combiner-subset of data providers of the plurality of data providers is configured to homomorphically combine at least a subset of the current encrypted aggregated local gradients into combined aggregated gradients, and to update the weights of the neural network global model by using averaged combined aggregated gradients to generate an updated neural network global model, wherein averaging is performed with respect to a global batch size equal to a dot product between the local batch size and a number of data providers, wherein the multiparty fully homomorphic encryption scheme is a quantum-resistant cryptographic scheme relying on parallel computations, single-instruction-multiple-data operations, and optimized polynomial approximations of activation functions of machine learning models.

11. The system of claim 10, wherein a particular data provider of the plurality of data providers is configured:

to receive, from a querying entity, encrypted input data that is encrypted with the collective cryptographic public key, and to receive a destination public key of a destination entity, the destination entity being a recipient of a prediction result to be provided in response to receiving the input data; and in response to receiving the encrypted input data, to obtain one or more corresponding encrypted prediction values by applying the neural network global model to the encrypted input data; and to switch the encrypted prediction values to the destination public key to generate switched encrypted prediction values, and to provide the switched encrypted prediction values to the querying entity so that only the destination entity can decrypt the encrypted prediction values.

12. The system of claim 11, wherein:

at least a subset of data providers of the plurality of data providers is configured:

to collectively switch the updated neural network global model to the destination public key of one or more destination entities to generate a switched neural network global model, and to provide the switched neural network global model to respective destination entities for obtaining a corresponding decrypted neural network global model.

13. The system of claim 10, wherein the computation of the forward pass and backpropagation uses a crypto-scheme with an alternating packing strategy by iteratively processing each data sample of the local batch of data samples, wherein alternating packing combines row-based and column-based packing, by vectorizing rows or columns of a weight matrix and packing vectorized rows or columns into at least one ciphertext.

14. The system of claim 13, wherein the layers in the neural network global model alternate between row-based packing and column-based packing.

* * * * *